United States Patent
Sondur et al.

(10) Patent No.: US 10,895,199 B2
(45) Date of Patent: Jan. 19, 2021

(54) METHOD AND SYSTEMS FOR AN AUXILIARY POWER UNIT

(71) Applicant: Transportation IP Holdings, LLP, Norwalk, CT (US)

(72) Inventors: Kaushik D. Sondur, Bangalore (IN); Giri Balu, Bangalore (IN); Sasikumar Vishwanathan Mudaliar, Bangalore (IN); Tharunendra Sekhar, Bangalore (IN); Jayaprakash Sabarad, Bangalore (IN); Rajeev R. Verma, Bangalore (IN)

(73) Assignee: TRANSPORTATION IP HOLDINGS, LLC, Norwalk, CT (US)

( * ) Notice: Subject to any disclaimer, the term of this patent is extended or adjusted under 35 U.S.C. 154(b) by 207 days.

(21) Appl. No.: 16/140,359

(22) Filed: Sep. 24, 2018

(65) Prior Publication Data

US 2020/0095926 A1 Mar. 26, 2020

(51) Int. Cl.
| | |
|---|---|
| *F02B 63/00* | (2006.01) |
| *F02B 63/04* | (2006.01) |
| *B61C 17/06* | (2006.01) |
| *F02B 63/06* | (2006.01) |
| *B61C 5/00* | (2006.01) |

(52) U.S. Cl.
CPC .............. *F02B 63/042* (2013.01); *B61C 5/00* (2013.01); *B61C 17/06* (2013.01); *F02B 63/06* (2013.01)

(58) Field of Classification Search
CPC .......... F02B 63/042; F02B 63/06; B61C 5/00; B61C 17/06
USPC .......................................................... 123/2
See application file for complete search history.

(56) References Cited

U.S. PATENT DOCUMENTS

| | | | | |
|---|---|---|---|---|
| 5,555,722 A | * | 9/1996 | Mehr-Ayin ............ | B64D 41/00 123/179.28 |
| 6,051,809 A | * | 4/2000 | Colella ................ | B23K 9/1006 219/133 |

(Continued)

FOREIGN PATENT DOCUMENTS

| | | |
|---|---|---|
| CN | 101515727 A | 8/2009 |
| EA | 005176 B1 | 12/2004 |
| WO | 2017088057 A1 | 6/2017 |

OTHER PUBLICATIONS

"Auxiliary Power Unit," Government of India Ministry of Railways Research Design & Standards Organization Website, Available Online at http://www.rdso.indianrailways.gov.in/works/uploads/File/priliminary%20revised%20draft%20APU%20Specification%20comments_Rev2.0%20d1.pdf, Mar. 13, 2015, 22 pages.

(Continued)

*Primary Examiner* — Hung Q Nguyen
*Assistant Examiner* — Anthony Donald Taylor, Jr.
(74) *Attorney, Agent, or Firm* — McCoy Russell LLP

(57) ABSTRACT

Various methods and systems are provided for an auxiliary power unit of a vehicle that provides electrical power and compressed air while a main engine of the vehicle is not running. In one example, an auxiliary power unit (APU) comprises: an engine, an alternator, and a compressor, all mounted to a common base frame in a triangular arrangement with the alternator and compressor arranged adjacent to one another and each of the alternator and compressor rotationally coupled with the engine through a gearbox spaced between the engine and each of the compressor and alternator.

18 Claims, 9 Drawing Sheets

(56) References Cited

U.S. PATENT DOCUMENTS

| | | | | |
|---|---|---|---|---|
| 6,651,929 B2* | 11/2003 | Dionne | ............... | B64D 33/08 244/57 |
| 6,660,967 B2* | 12/2003 | Brofft | ............... | F02B 63/04 219/133 |
| 6,992,265 B2* | 1/2006 | Bender | ............... | B23K 9/1006 219/133 |
| 7,309,929 B2 | 12/2007 | Donnelly et al. | | |
| 8,600,590 B2* | 12/2013 | Frazier | ............... | B61C 3/00 701/19 |
| 8,733,694 B2* | 5/2014 | Francisco | ............... | B64D 33/02 244/58 |
| 8,880,248 B2 | 11/2014 | Frazier et al. | | |
| 8,921,735 B2* | 12/2014 | Helf | ............... | F04C 18/16 219/133 |
| 9,014,884 B2* | 4/2015 | Pritchard | ............... | B61L 15/0081 701/19 |
| 9,114,812 B2 | 8/2015 | Frazier et al. | | |
| 9,145,149 B2 | 9/2015 | Frazier et al. | | |
| 9,403,539 B2 | 8/2016 | Pykkonen et al. | | |
| 9,731,604 B2* | 8/2017 | Eisa | ............... | B60L 1/003 |
| 9,821,819 B2 | 11/2017 | Frazier et al. | | |
| 2002/0189564 A1* | 12/2002 | Biess | ............... | F02D 25/04 123/142.5 R |
| 2004/0104578 A1* | 6/2004 | Wurtele | ............... | B60H 1/00378 290/1 A |
| 2004/0169374 A1* | 9/2004 | Wurtele | ............... | B60H 1/00378 290/1 A |
| 2004/0182846 A1* | 9/2004 | Silvestro | ............... | F02B 63/04 219/133 |
| 2006/0107920 A1* | 5/2006 | Serkh | ............... | F02B 63/04 123/198 R |
| 2006/0131885 A1* | 6/2006 | Wurtele | ............... | B60H 1/00378 290/1 A |
| 2007/0132243 A1* | 6/2007 | Wurtele | ............... | F01N 13/08 290/1 A |
| 2013/0325257 A1* | 12/2013 | Waldschmidt | ............... | B60K 25/00 701/36 |
| 2014/0299589 A1* | 10/2014 | Fosbinder | ............... | B23K 9/1006 219/133 |
| 2017/0037775 A1* | 2/2017 | Jones | ............... | F02B 37/24 |
| 2017/0037776 A1* | 2/2017 | Jones | ............... | F01C 21/18 |
| 2017/0226959 A1* | 8/2017 | Julien | ............... | F02B 53/02 |

OTHER PUBLICATIONS

Sondur, K. et al., "Method and Systems for an Auxiliary Power Unit for a Locomotive," U.S. Appl. No. 16/140,329, filed Sep. 24, 2018, 60 pages.

* cited by examiner

METHOD AND SYSTEMS FOR AN AUXILIARY POWER UNIT

BACKGROUND

Technical Field

Embodiments of the subject matter disclosed herein relate to a vehicle and operation of an auxiliary power unit when a primary engine of the vehicle is not running.

Discussion of Art

A vehicle may include a main engine for propelling the vehicle and an auxiliary power unit (APU) that generates electrical energy for powering one or more components of the vehicle when the main engine is unable to do so, such as when the main engine is shut down while the vehicle is in operation (e.g., such as due to a non-moving condition of the vehicle). The APU may include an engine that is smaller than the main engine, thereby reducing fuel consumption compared with maintaining operation of the main engine to provide power to the one or more components of the vehicle. For example, the engine of the APU may be rotationally coupled to an alternator of the APU for generating the electrical energy, which is then supplied to one or more electrical loads of the vehicle. As another example, the APU may further include a compressor that is rotationally coupled to the engine of the APU. The compressor may be configured to provide compressed air to an air reservoir of the vehicle for air brakes. Thus, the air brakes of the vehicle may be maintained while the APU is operated and the main engine is shut down.

BRIEF DESCRIPTION

In one embodiment, an auxiliary power unit (APU) includes an engine, an alternator, and a compressor, all mounted to a common base frame in a triangular arrangement with the alternator and compressor arranged adjacent to one another and each of the alternator and compressor rotationally coupled with the engine through a gearbox spaced between the engine and each of the compressor and alternator. The base frame, with the engine, alternator, compressor, and gearbox attached thereto, is moveable as a unit into and out of a vehicle. That is, the base frame, the engine, the alternator, the compressor, and the gearbox are all moveable together, as a unified whole, for putting the APU into a vehicle, and for removing the APU from a vehicle, through manipulation (e.g., moving the APU using a forklift) of the base frame, and without having to remove or detach any of the engine, alternator, compressor, or gearbox from the common base frame. In another embodiment, the APU defines a volume with an outer periphery, and a vehicle includes a complementary-shaped receptacle that is sized to receive the APU as a whole unit (base frame, engine, alternator, compressor, and gearbox) without having to remove or detach any of the engine, alternator, compressor, or gearbox from the common base frame.

BRIEF DESCRIPTION OF THE DRAWINGS

FIGS. 4-6 are shown to scale.

DETAILED DESCRIPTION

Figure 1:
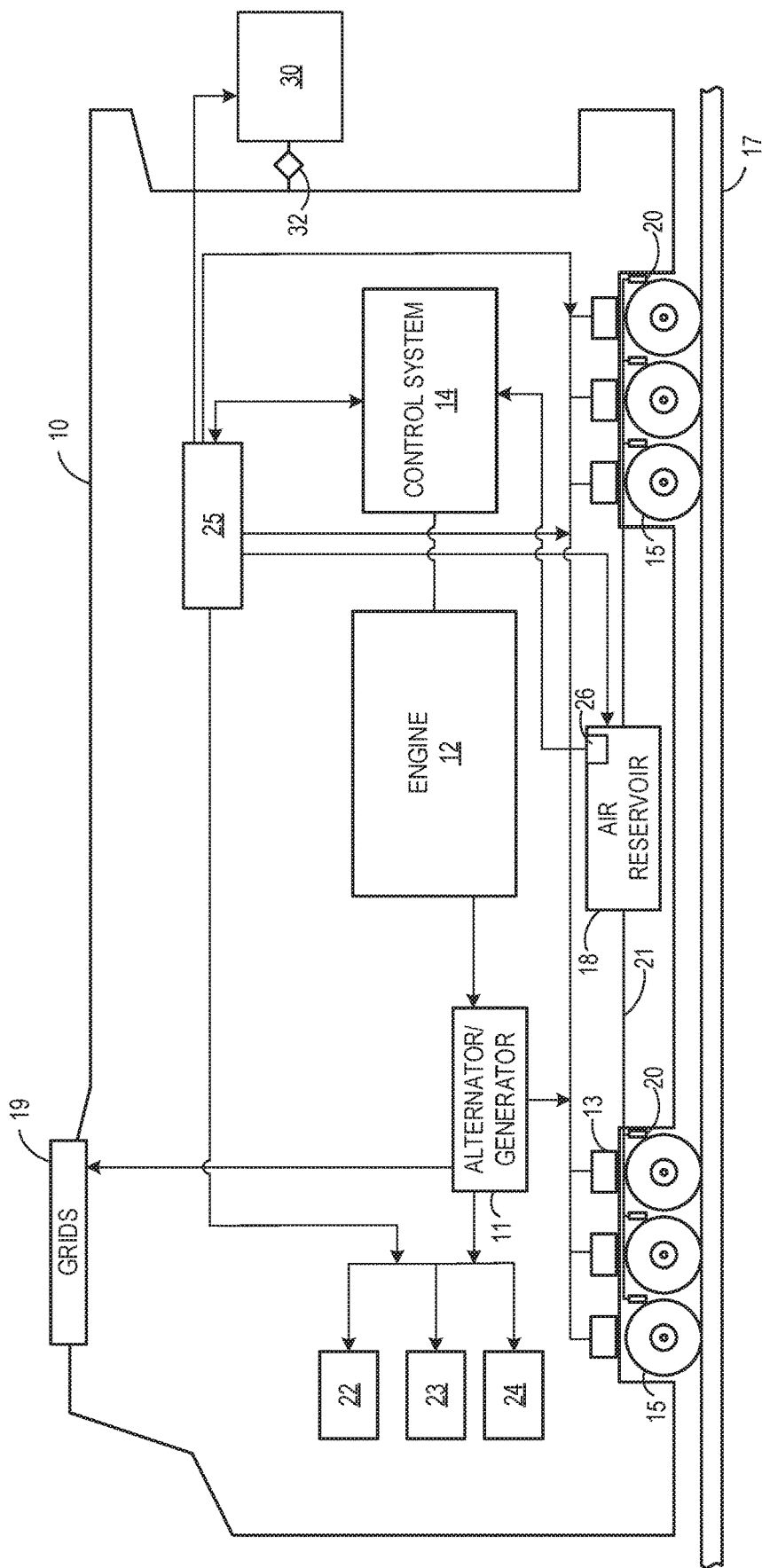
FIG. 1 shows a schematic representation of a vehicle with a primary engine and an auxiliary power unit according to an embodiment of the invention.

The following description relates to embodiments of an auxiliary power unit (APU), including: an engine, an alternator, and a compressor, all mounted to a common base frame in a triangular arrangement with the alternator and compressor arranged adjacent to one another and each of the alternator and compressor rotationally coupled with the engine through a gearbox spaced between the engine and each of the compressor and alternator. In one example, the base frame may be included in a rectangular external housing that completely encloses the engine, the alternator, and the compressor. As another example, the base frame may include elongate cavities adapted to receive prongs of a fork lift. For example, the elongate cavities may span across a length of the base frame, with openings on a first end of the base frame and a second end of the base frame, and may be arranged parallel to one another. As another example, the auxiliary power unit may further include an air vent arranged on a top wall of the exterior housing that is configured to provide air from external to the exterior housing to a compressor cooler arranged internal to the exterior housing, the compressor cooler configured to provide cooling airflow to the compressor. As still another example, the external housing and the air vent may be adapted to fit within a rectangular space in a radiator cab of a rail vehicle, with the elongate apertures positioned perpendicular to a longitudinal axis of the vehicle when the APU is installed in the rectangular space of the radiator cab.

Traditionally, complex interfaces have been employed to coordinate operation of standard APUs with vehicle battery charging and air reservoir filling. Further, standard APUs may comprise a large amount of packaging space in the vehicle, and as such, down-sized vehicles may not be able to accommodate an APU. However, the embodiments described herein enable the APU to be activated in response to a main engine of vehicle being shut down, regardless of a state of charge of the vehicle battery and an air pressure of the air reservoir. For example, a controller (e.g., control unit) of the APU may be a secondary controller that is activated by a primary controller of the vehicle in response to the main engine shutting down. The controller of the APU may then adjust an output of the APU based on signals received from the primary controller (e.g., regarding the state of charge of the vehicle battery and the air pressure of the air reservoir). In this way, the state of charge of the vehicle battery and the air pressure in the air reservoir are reliably maintained while reducing fuel consumption by maintaining the main engine shut down and adjusting the output of the APU responsive to the signals received from the primary controller. Furthermore, the APU may power additional vehicle electrical loads, such as lights and a heating, ventilation, and air conditioning (HVAC) system, thereby maintaining vehicle occupant comfort without draining the vehicle battery.

Further, embodiments of the APU may include a compact, high speed engine coupled to an alternator and a compressor via a gearbox. The gearbox may enable the engine, the alternator, and the compressor to all operate at different speeds. The engine, the alternator, and the compressor of the APU may be positioned in a triangular arrangement with respect to each other, thereby reducing a length of the APU and increasing a compactness of the APU compared with a linear arrangement of the APU engine, alternator, and compressor. Further still, the compressor may be coupled to the gearbox via a clutch, enabling the compressor to be decoupled from the APU engine and deactivated when the air reservoir is full, thereby further reducing fuel consumption by the APU. In addition, the APU may include an exterior housing that encloses the engine, the compressor, the alternator, the gearbox, and the controller. The APU may be positioned in vehicle so that a length of the APU is perpendicular to a longitudinal direction of the vehicle. By positioning the APU perpendicular with respect to the longitudinal axis of the vehicle, a clear air path may be provided through the APU (e.g., from a first side to a second side). Further still, the APU may be installed in the vehicle from either side of the vehicle, thereby avoiding disruption of a roof of the vehicle. In particular, a base unit of the exterior housing may include elongate apertures adapted to receive prongs of a forklift so that the APU may be installed from either side of the vehicle via a forklift. In this way, the compact, single-unit APU may be easily installed in the vehicle in a position that does not place other vehicle equipment in the air path of the APU.

Figure 2:
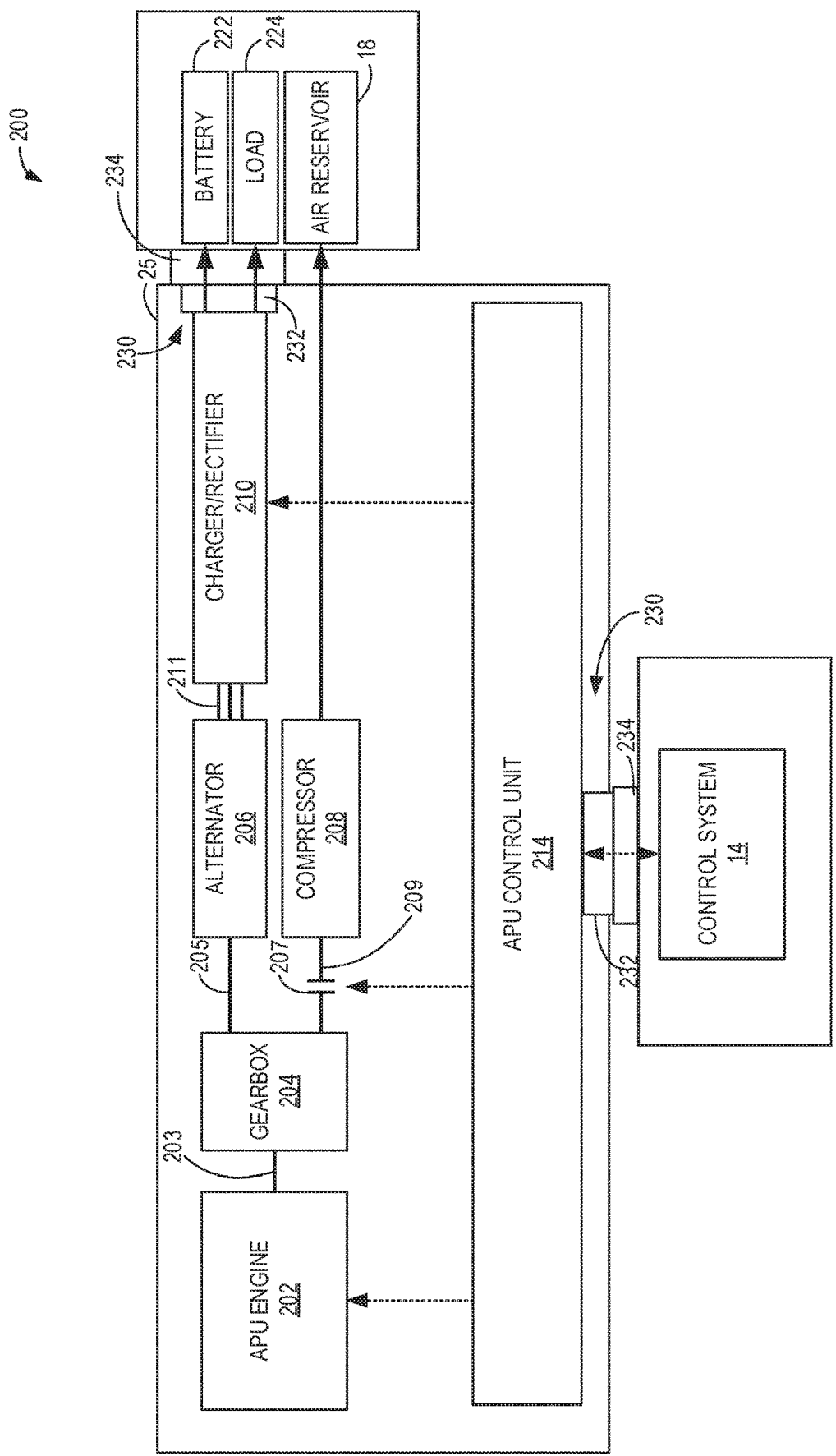
FIG. 2 shows a schematic diagram of mechanical and electrical connections of an auxiliary power unit including an engine, a compressor, and an alternator, according to an embodiment of the invention.
Figure 3:
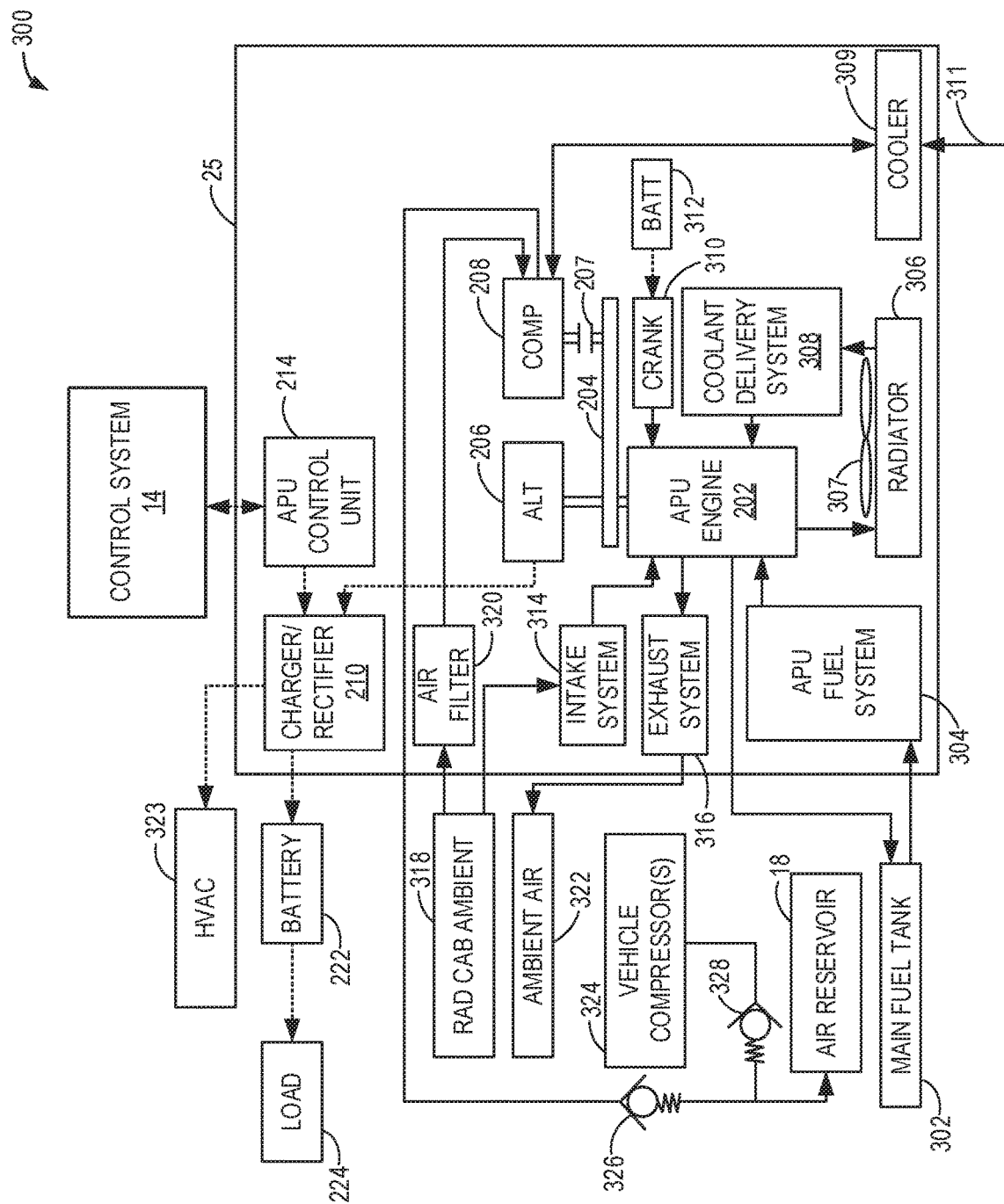
FIG. 3 shows a schematic diagram of mechanical and electrical connections of an auxiliary power unit in relation to additional vehicle components, according to an embodiment of the invention.
Figure 4:
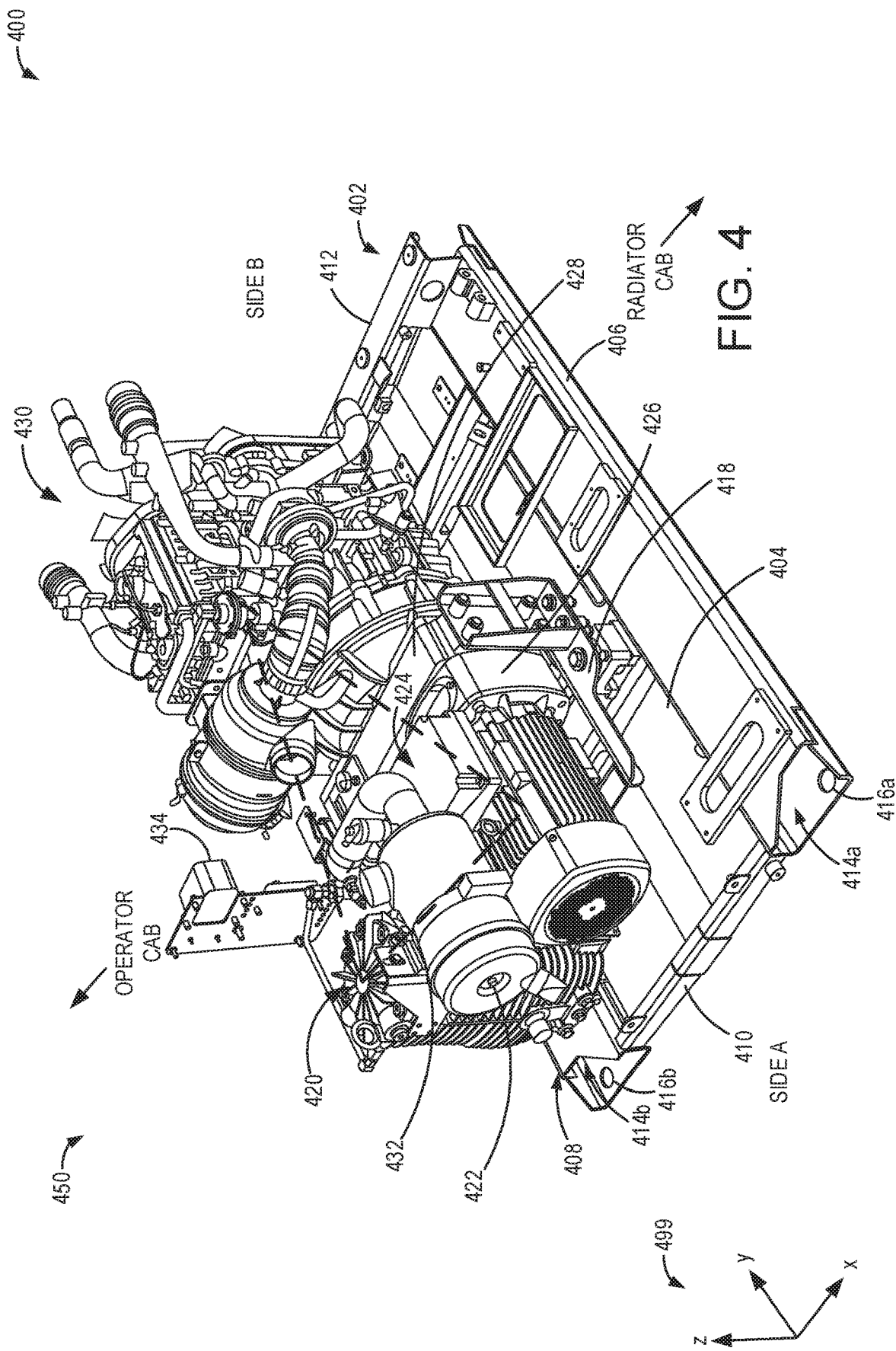
FIG. 4 shows a perspective view of internal components of an auxiliary power unit according to an embodiment of the invention.
Figure 5:
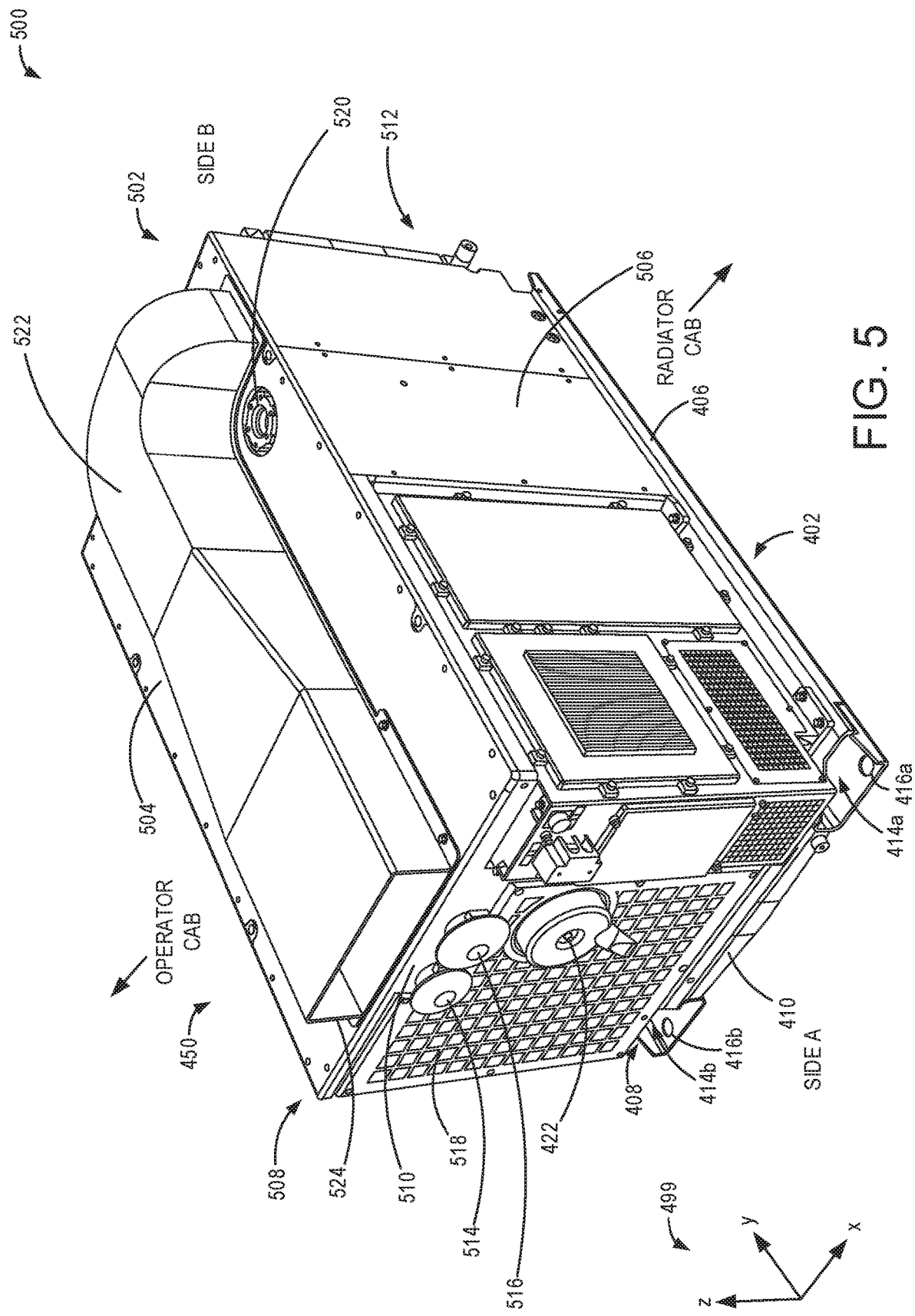
FIG. 5 shows a perspective view of external components of an auxiliary power unit according to an embodiment of the invention.
Figure 6:
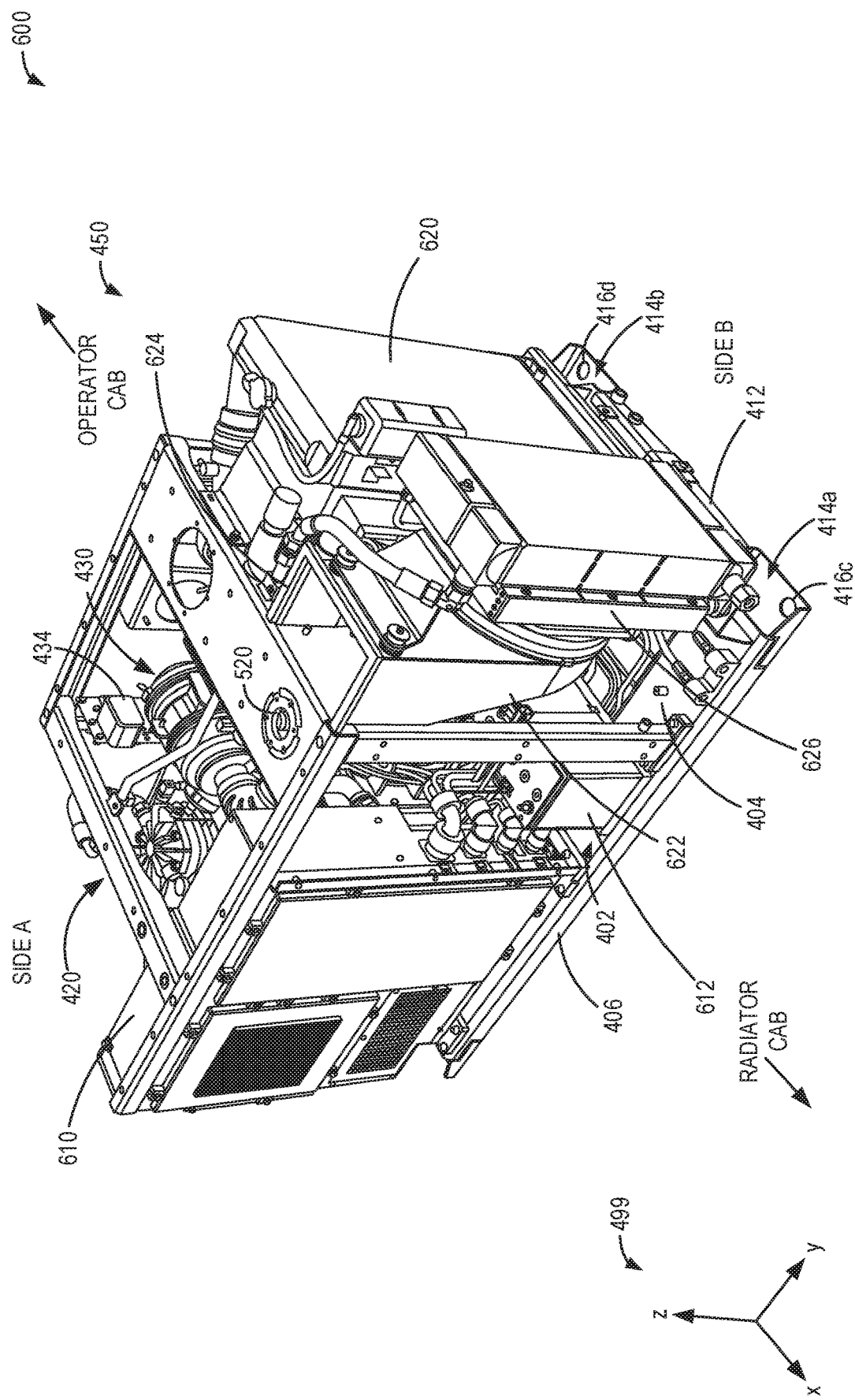
FIG. 6 shows a perspective view of an auxiliary power unit with an outer housing removed, according to an embodiment of the invention.
Figure 7:
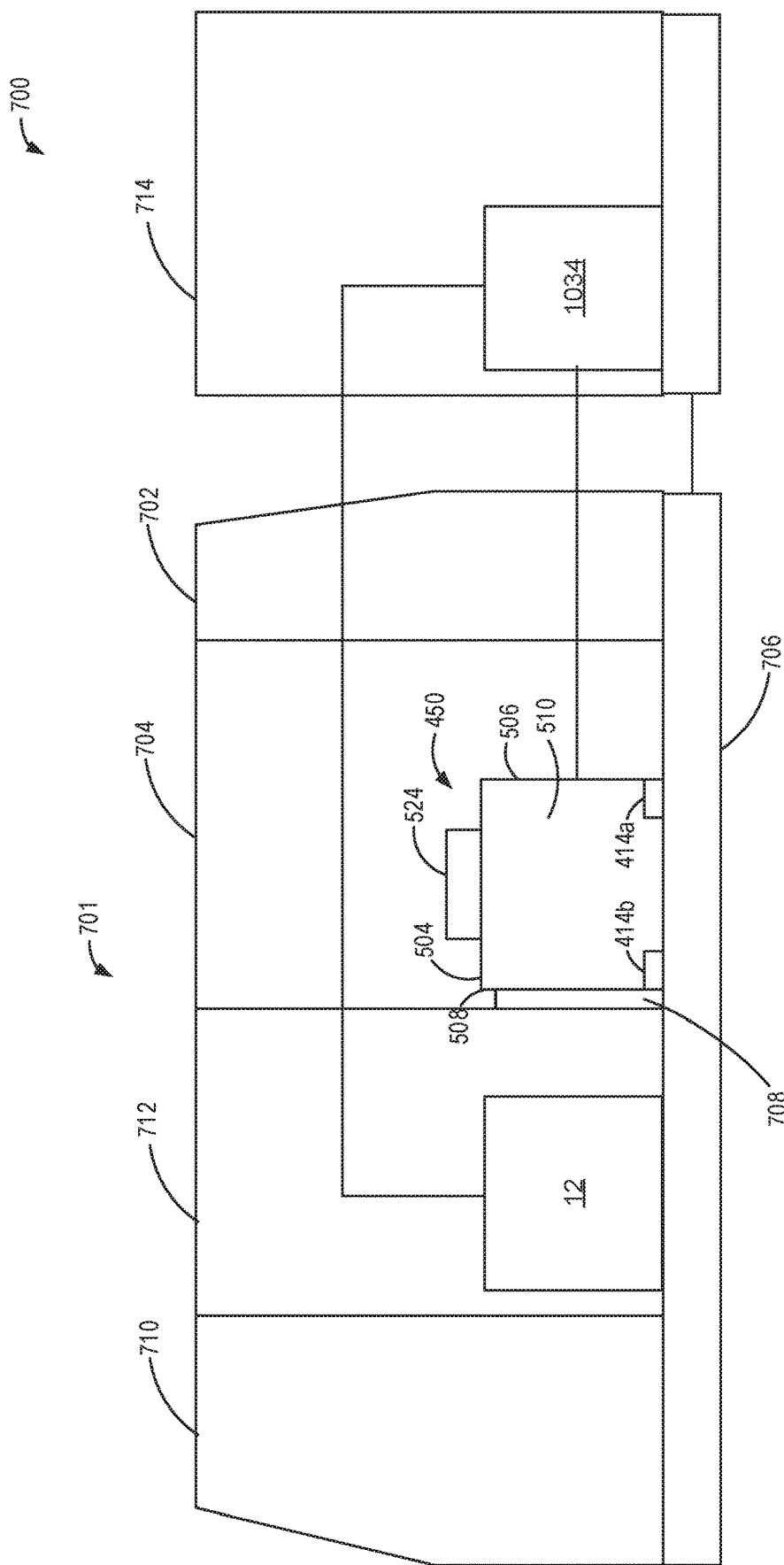
FIG. 7 shows a schematic representation of a positioning on an auxiliary power unit within a vehicle.

FIG. 1 shows an embodiment of a vehicle in which an engine system, including an APU, may be installed. In some examples, the APU and a main engine for propelling the vehicle may receive fuel from a common fuel tank. In another example, the vehicle may further include a liquid natural gas fuel container (e.g., tank) on a fuel tender, as shown in FIG. 9, and the main engine may be a dual fuel engine. As shown in FIGS. 2 and 3, the APU may include an engine rotationally coupled to both a compressor and an alternator via a gearbox. Further, the compressor of the APU may be fluidically coupled to an air reservoir of the vehicle while the alternator may be electrically coupled to one or more electrical loads of the vehicle via a charger/rectifier of the APU, as also shown in FIGS. 2 and 3. The APU engine, the compressor, and the alternator may be enclosed by a rectangular housing and arranged in a triangular configuration with respect to each other, as illustrated in FIGS. 4-6. As shown in FIG. 7, the APU may be positioned in a radiator cab of the vehicle, behind an operator cab, and oriented transversely with respect to a longitudinal axis of the vehicle. A control unit of the APU may be configured to operate the APU to provide electrical power to the one or more electrical loads of the vehicle and compressor air to the air reservoir of the vehicle in response to a main engine of the vehicle shutting down, such as according to the method of FIG. 8. In one aspect, "main engine" refers to an engine of a vehicle other than an APU engine. Additionally, the main engine may be primarily used for powering vehicle propulsion, that is, the majority of its power output is used for propulsion, and/or the main engine may have a larger capacity or power rating than the APU engine. As a result, vehicle fuel consumption may be reduced by shutting down the main engine while maintaining operation of desired electrical components of the vehicle and an air pressure of the air reservoir via the APU.

The approach described herein may be employed in a variety of engine types, and a variety of engine-driven systems. Some of these systems may be stationary, while others may be on semi-mobile or mobile platforms. Semi-mobile platforms may be relocated between operational periods, such as mounted on flatbed trailers. Mobile platforms include self-propelled vehicles. Such vehicles can include on-road transportation vehicles, as well as mining equipment, marine vessels, rail vehicles, and other off-highway vehicles (OHV). For clarity of illustration, a locomotive is provided as an example of a mobile platform supporting a system incorporating an embodiment of the invention.

Referring to FIG. 1, a schematic representation of a vehicle 10 moving from a first operating point to a second operating point along a predefined path is disclosed. In the illustrated embodiment, the vehicle is a rail vehicle, such as a locomotive. For example, as depicted in FIG. 1, the rail vehicle is configured to run on a rail 17 via a plurality of wheels 15. Suitable vehicles include passenger and non-passenger vehicles, hybrid vehicles, off-highway vehicles, on-road vehicles (such as tractor trailers), tracked vehicles, rail vehicles, and the like. The vehicle includes an engine 12 and an exemplary control system 14 coupled to the engine. In one embodiment, the engine may be a dual fuel engine. The engine may be referred to herein as a main power unit (MPU).

In one embodiment, the vehicle is driven by the engine utilizing a plurality of fuels. In the exemplary engine, a reduction in nitrogen oxide (NOx) and particulate matter (PM) emissions is enabled by combusting a relatively larger fraction of the premixed fuel. For example, in some embodiments, diesel and natural gas may be utilized to drive the engine. It should be noted herein that in certain embodiments, the vehicle may also utilize other fuels instead of diesel and natural gas. A ratio of secondary fuel (e.g., natural gas) to total fuel (secondary fuel and primary fuel (e.g., diesel fuel)) delivered to the engine for combustion may be referred to herein as a substitution ratio.

In one embodiment, the rail vehicle is a diesel-electric vehicle. As depicted in FIG. 1, the engine is coupled to an electric power generation system, which includes an alternator/generator 11 and a plurality of electric traction motors 13. For example, the engine is a diesel and/or natural gas engine that generates a torque output that is transmitted to the alternator/generator which is mechanically coupled to the engine.

The alternator/generator produces electrical power that may be stored and applied for subsequent propagation to a variety of downstream electrical components. As an example, the alternator/generator may be electrically coupled to the plurality of electric traction motors, and the alternator/generator may provide electrical power to the plurality of electric traction motors. The plurality of electric traction motors may collectively comprise an electric drive propulsion system. As depicted, the plurality of electric traction motors are each connected to one of the plurality of wheels to provide tractive power to propel the rail vehicle. One example configuration includes one traction motor per wheel set. As depicted herein, six traction motors correspond to each of six pairs of motive wheels of the rail vehicle. In another example, alternator/generator may be coupled to one or more resistive grids 19. The resistive grids may be configured to dissipate excess engine torque via heat produced by the grids from electricity generated by the alternator/generator. In alternate embodiments, excess engine torque may be dissipated to an alternate component, such as an energy storage device, or additional electrical components 22, 23, and 24. As an example, and as shown in FIG. 1, the additional electrical components powered by the alternator/generator may include one or more of compressors, blowers, batteries, and controllers (such as a controller of the control system or additional vehicle controllers). In one example, the batteries may include a cranking battery for providing a starting operation of the engine. In another example, additionally or alternatively, the batteries may include a propulsion battery bank configured to provide electrical power to the electric drive propulsion system. Further, the additional electrical components may include hotel loads of the vehicle, such as electrical loads included in a climate control system (e.g., a heating, ventilation, and air conditioning system), a communication system (including communication equipment), an entertainment system, vehicle lights, a natural gas regasification unit (e.g., vaporizer), engine filters, etc. As used herein, the term "hotel load" refers to any electrical load of the vehicle that is not used to propel the vehicle.

The vehicle additionally includes an auxiliary power unit (APU) 25. The APU may include a second, smaller engine (compared with the engine for driving the vehicle) coupled to an alternator and a compressor. Further details of the APU are described below in reference to FIGS. 2-6. For example, schematics of the mechanical and electrical couplings of components of the APU are shown in FIGS. 2 and 3, and an example spatial arrangement and packaging of the components is shown in FIGS. 4-6. As shown in FIG. 1, the APU is electrically coupled to the additional electrical components of the vehicle, the electric traction motors 13 (e.g., the electric drive propulsion system), and the vehicle control system. As described further below, when the engine (vehicle engine 12) is off (e.g., shut down and not combusting fuel to produce exhaust gas), the APU may still produce energy via the second engine. Energy may then be provided to the electrical components of the vehicle, while the engine is off, from the APU. Additionally, the APU may be operated to produce additional energy while the engine (vehicle engine 12) is on (e.g., combusting air and fuel), as will be described further below with respect to FIG. 8.

The APU may also be coupled to an air reservoir 18, as shown in FIG. 1. For example, the compressor of the APU may provide pressurized air to the air reservoir while the engine is off. The air reservoir may in turn supply air to a plurality of air brakes 20 via a brake pipe 21. The plurality of air brakes may engage or disengage with the plurality of wheels based on the air pressure in the brake pipe. As shown in FIG. 1, each of the plurality of air breaks may be connected to one of the plurality of wheels. As an example, when the air pressure supplied to brake pipe is high (e.g., higher than a non-zero threshold pressure), the air brakes may be disengaged from, and not in contact with, the plurality of wheels. As another example, when the air pressure supplied to the brake pipe is reduced (e.g., below the non-zero threshold pressure), the air brakes may engage the plurality of wheels, resulting in friction that slows the wheels and thus the movement of the vehicle. Further, a pressure sensor 26 coupled to the air reservoir may provide an indication of an air pressure (or level) in the air reservoir to the vehicle control system. For example, the vehicle control system may regulate an amount of air provided to the air reservoir based on an output of the pressure sensor.

The APU may also be electronically coupled to a robotic machine 30. The robotic machine may be selectively coupled to the vehicle via a mechanical coupling mechanism 32. While the robotic machine is mechanically coupled to the vehicle, the robotic machine may also be electronically coupled to the APU in order to receive electrical power generated by the APU. For example, electrical power may be supplied from the APU to the robotic machine to operate electrical or electro-mechanical systems of the robotic machine. As another example, electrical power may be supplied from the APU to the robotic machine to charge a battery pack of the robotic machine.

The vehicle control system is configured to adjust operation of the engine and the APU. As one example, the vehicle control system may include an Auto Engine Start Stop (AESS) system configured to automatically (e.g., without direct input from an operator of the vehicle) shut down the engine during vehicle operation in response to a first condition (e.g., an engine shutdown condition) and automatically restart the engine in response to a second condition (e.g., an engine restart condition). In one example, the vehicle shutdown condition may include the vehicle being stationary for a threshold duration. The vehicle control system and methods for controlling the engine and the APU are explained in greater detail below with reference to subsequent figures, particularly with regard to FIG. 8.

Next, FIG. 2 presents a block diagram of an exemplary embodiment of an APU system 200, including APU 25 of FIG. 1, that may be included in a vehicle (e.g., vehicle 10 shown in FIG. 1). As such, components of FIG. 2 that are functionally equivalent to components of FIG. 1 are numbered the same and may not be reintroduced. The APU is shown including an APU engine 202 coupled to an alternator 206 and a compressor 208 via a gearbox 204. The gearbox is rotationally coupled to the APU engine via a crankshaft 203 of the APU engine, thereby rotationally coupling the compressor and the alternator to the crankshaft. As an example, the alternator may be a three-phase alternator, and the compressor may be a rotary screw compressor. The gearbox enables the APU engine, the alternator, and the compressor to operate at different speeds. For example, the APU engine may be a compact, high speed diesel engine with a high power to length by breadth by height (LBH) ratio of the APU. Non-limiting example measurements of the APU include a length of 168.5 cm, a breadth (e.g., width) of 92 cm, and a height of 85 cm. In another example, the APU may have a length in a range of 167-170 cm, a breadth in a range of 90-94 cm and a height in a range of 83-87 cm. Further, the gearbox enables a generally triangular arrangement of the APU engine, the alternator, and the compressor, as will be further illustrated below with respect to FIG. 4.

A drive shaft 209 of the compressor is connected to the gearbox via a clutch 207. As an example, the clutch may be an eddy current clutch. An APU control unit 214 may send a command signal to the clutch to engage or disengage the clutch, so as to connect or disconnect the compressor from the gear box (and thus the APU engine). For example, the APU control unit may send an actuation signal to an actuator of the clutch (such as a pneumatic, electric motor, or electromagnetic actuator) to engage the clutch, thereby rotationally coupling the drive shaft of the compressor to the crankshaft of the APU engine, and operating the compressor to provide air to the air reservoir. For example, rotational energy from the APU engine may be transferred to the drive shaft of the compressor, thereby rotating the compressor and causing the compressor to output compressed air to the air reservoir. As another example, the APU control unit may send an actuation signal to the actuator of the clutch to disengage the clutch, thereby uncoupling the drive shaft of the compressor from the crankshaft of the engine, thereby deactivating the compressor so that the compressor does not provide air from the compressor to the air reservoir. By disengaging the clutch and uncoupling the compressor from the APU engine, overcharging of the air reservoir may be reduced or prevented. Additionally, when the compressor does not require rotational power from the APU engine, the output of the APU engine may be reduced (e.g., less fuel may be consumed at the APU engine). The control of the compressor will be further described below with respect to FIG. 8.

As shown in FIG. 2, a drive shaft 209 of the alternator is mechanically coupled to the gearbox, which is mechanically coupled to the APU engine. Operating the APU engine (e.g., by combusting air and fuel) rotates the alternator via the gearbox and the drive shaft of the alternator, generating a three-phase alternating current 211 at the alternator. The three-phase alternating current generated by the alternator is supplied to a charger/rectifier 210, which converts the alternating current (AC) to a direct current (DC) that may be supplied to electrical loads, including a system battery 222 and a load 224. The system battery and the load may comprise one or more of the additional electrical components 22, 23, and 24 of FIG. 1, for example. As an example, the battery may be a system battery of the vehicle, and the load may be vehicle lights. The vehicle lights may comprise a plurality of lights included on the exterior of the vehicle and the interior of the vehicle, for example. In another example, the vehicle load may additionally or alternately be a climate control system (e.g., HVAC system) of the vehicle. As another example, the battery may be included in a propulsion battery bank, and the load may be electric traction motors (e.g., electric traction motors 13 shown in FIG. 1). For example, the battery 222 may be a propulsion battery for supplying electrical power to the electric traction motors to propel the vehicle, rather than a cranking battery for the engine of the vehicle.

In addition to transmitting a command signal to actuate the actuator of the clutch to move a position of the clutch, the APU control unit may transmit a command signal to actuators of the APU engine (such as fuel injectors, intake and exhaust valves, etc.) in order to adjust operation thereof as well as the charger/rectifier in order to adjust operation thereof. As an example, the APU control unit may be a microcomputer, including a microprocessor unit, input/output ports, an electronic storage medium (e.g., memory) for executable programs (e.g., executable instructions) and calibration values (e.g., a non-transitory read-only memory chip), random access memory, keep alive memory, and a data bus. The APU control unit may receive various signals from sensors coupled to the APU engine and employ various actuators of the APU engine to adjust engine operation based on the received signals and instructions stored on a memory of the APU control unit.

Further, the APU control unit may communicate with the vehicle control system, such as over a controller area network. The vehicle control system may be a primary controller with unidirectional control over the APU control unit, which may be a secondary controller. For example, the vehicle control system may transmit control signals to the APU control unit, which may transmit feedback signals (e.g., regarding operating parameters) to the vehicle control system. The vehicle control system may then adjust the control signals transmitted to the APU control unit based on the feedback signals received by the APU control unit and further based on signals received from sensors of the vehicle system and executable instructions stored on a memory of the vehicle control system.

As one example, the APU includes an electrical and control interface 230 that includes electrical connections 232 for transferring electrical power and/or control signals to the vehicle 10. For example, the electrical connections may be physical connectors/couplers that connect directly to mating electrical interfaces (e.g., connections) 234 on the vehicle. Thus, as the frame of the APU is loaded into place on the vehicle (as shown in FIG. 7), the electrical connections 232 may automatically engage with the mating electrical interfaces 234. Similarly, these connections may automatically disconnect when the APU is removed from the vehicle. Further, the control system 14 of the vehicle may receive a signal, via the mating electrical connections of the electrical and control interface that indicates that the APU is installed on the vehicle (instead of not being installed or a different components, such as a battery, being installed in the space adapted to accept the APU).

FIG. 3 shows a block diagram of an exemplary embodiment of an APU system 300, including APU 25 of FIGS. 1 and 2, that may be included in a vehicle (e.g., vehicle 10 shown in FIG. 1). FIG. 3 shows additional components that may be included in the APU system and the vehicle. As such, components of FIG. 3 that are functionally equivalent to components of FIGS. 1 and 2 are numbered the same and may not be reintroduced. Further, only a subset of the signals transmitted and received by the APU control unit are illustrated in FIG. 3, and it should be understood that the signals shown between the APU control unit and other components of the APU are not limiting in nature.

As shown in FIG. 2, the APU engine 202 may receive fuel from a main fuel tank 302 via an APU fuel system 304. For example, the main fuel tank may supply fuel to the engine of the vehicle (e.g., engine 12 shown in FIG. 1) in addition to the APU engine. The main fuel tank may store diesel fuel, for example. The APU fuel system may be a return-style fuel system, as shown, a returnless fuel system, or the like. The APU fuel system may include one or more fuel tanks for storing fuel received from the main fuel tank, one or more fuel pumps for delivering and/or pressurizing the fuel, a fuel filter, etc. Fuel may be received by the APU fuel system from the main fuel tank and supplied to the APU engine following cranking of the engine by a starter motor 310. For example, responsive to a control signal received from the vehicle control system to start the APU engine, the APU control unit may supply power from a battery 312 of the APU to the starter motor to enable a starting operation of the APU engine.

During operation, the APU engine may be cooled by a cooling system including a radiator 306, a cooling fan 307, and a coolant delivery system 308. For example, the coolant delivery system may comprise a coolant tank and a coolant pump for circulating liquid coolant around the APU engine to absorb waste heat and then distribute the heated liquid coolant to the radiator. The radiator may be a heat exchanger configured to transfer heat from the heated liquid coolant to ambient air. Further, the cooling fan may be operated to increase airflow through the engine and through the radiator, also cooling the liquid coolant. The cooled liquid coolant may flow from the radiator to the coolant tank of the coolant delivery system, for example.

Air for combustion may be supplied to the APU engine via an intake system 314. For example, the intake system may include one or more air filters, intake passages, intake manifolds, intake valves, etc. As an example, the intake system may receive cool ambient air 318 from a radiator cab of the vehicle. Exhaust gas from the combustion of air and fuel by the APU engine may be expelled via an exhaust system 316. For example, the exhaust system may include one or more exhaust valves, exhaust passages, exhaust after-treatment systems, mufflers, etc. After passing through the exhaust system, the exhaust gas may be released to ambient air 322 outside of the vehicle.

In addition to being supplied as intake air to the intake system, the cool ambient air from the radiator cab may also be supplied to the compressor of the APU after passing through an air filter 320. Once compressed by the compressor of the APU, the pressurized air may be supplied to the air reservoir via a first check valve 326. The first check valve may be a one-way mechanical valve that opens to enable air to flow from the compressor of the APU to the air reservoir and closes to prevent airflow from the air reservoir toward the compressor, for example. Further, the compressed air from the compressor may be cooled by a compressor cooler (e.g., combicooler) 309 before being supplied to the air reservoir. The compressor cooler may be a split heat exchanger having a first section for cooling the compressed air and a second section for cooling oil of the compressor. Cool, ambient air from external to the vehicle, which serves as gaseous coolant in the compressor cooler, may be supplied to the compressor cooler via an air intake passage 311. The compressor cooler may then transfer heat from the compressed air to the ambient air (e.g., in the first section) and transfer heat from the compressor oil to the ambient air (e.g., in the second section).

The air reservoir may further receive pressurized air from one or more vehicle compressors 324. As one example, the one or more vehicle compressors may be motor-driven screw compressors that are driven with electrical power supplied by the system battery. In another example, one or more of the vehicle compressors may be additionally or alternatively be driven by electrical power supplied directly by the charger/rectifier of the APU. The pressurized air from the one or more vehicle compressors may be supplied to the air reservoir via a second check valve 328. The second check valve may be a one-way mechanical valve that opens to enable air to flow from the one or more vehicle compressors to the air reservoir and closes to prevent airflow from the air reservoir toward the one or more vehicle compressors, for example.

The charger/rectifier may supply DC power a heating, ventilation, and air conditioning (HVAC) system 323 in addition to the system battery. The HVAC system may be included in the additional electrical components 22, 23, and 24 of FIG. 1, for example. The HVAC system may include an inverter and an air conditioning compressor, for example. In the example configuration shown in FIG. 3, the system battery supplies power to the load. However, the charger/rectifier of the APU may additionally or alternatively supply power directly to the load, such as in the example configuration shown in FIG. 2.

FIGS. 4-6 show an exemplary embodiment of an APU 450, which may be the APU 25 shown in FIGS. 1-3, for example. In particular, FIG. 4 shows a first perspective view 400 highlighting internal components of the APU, FIG. 5 shows a second perspective view 500 highlighting external components and surfaces of the APU, and FIG. 6 shows a third perspective view 600 with a portion of the external surfaces removed. Each of the first perspective view, the second perspective view, and the third perspective view are oriented with respect to reference axes 499. In one example, the APU may be installed in a vehicle, such as the rail vehicle 10 shown in FIG. 1, with a longitudinal axis of the vehicle arranged parallel to the x-axis of the reference axes shown in FIGS. 4-6.

Turning first to FIG. 4, the APU includes a compressor 420 and an alternator 424, each coupled with an engine 430 via a gearbox 428. Specifically, the compressor is rotationally coupled to the gearbox (via a first mechanical connection), which is rotationally coupled to the engine (via a second mechanical connection) and the alternator is rotationally coupled to the same gearbox (via a third mechanical connection), which is rotationally coupled to the engine (via the second mechanical connection). As shown in FIG. 4, the rotational connection between the alternator and the gearbox (e.g., the third mechanical connection) may be enclosed by a coupling housing 426.

Each of the compressor, the alternator, the engine, and the gearbox are mounted to a top surface 404 of a common base frame (e.g., base unit) 402. The base frame is part of a housing of the APU, as shown in FIGS. 5 and 6, as further described below. One or more of the compressor, the alternator, the engine, and the gearbox may be coupled to the base frame via a support frame 418. The support frame may reduce vibrations transferred between the base frame and the coupled components, for example. The support frame may be removably coupled to the top surface of the base frame via bolts, screws, or other fasteners, for example. Similarly, the engine, the compressor, and the alternator may be removably coupled to the support frame and/or the base frame via bolts, screws, or other fasteners. Thus, while coupled to the base frame and/or the support frame (e.g., via the bolts, screws, or other fasteners), the engine, the compressor, and the alternator are held fixedly in place with respect to the base frame and with respect each other. The compressor, the alternator, and the engine are positioned in a triangular arrangement with respect to each other, as indicated by a dashed triangle 432, with the compressor and the alternator arranged adjacent to and parallel to one another. Specifically, a drive shaft of each of the alternator and the compressor are arranged parallel to one another and directly, rotationally coupled to the gearbox. Both of the compressor and the alternator are separated from the APU engine, in a direction of the y-axis (of reference axes 499), by the gearbox. Said another way, the gearbox is positioned between the engine and the compressor and the engine and the alternator, in the direction of the y-axis, which is parallel to the rotational axis of the drive shafts of the alternator and the compressor and the crankshaft of the engine. Further, the compressor and alternator are arranged directly adjacent to one another, in the direction of the x-axis, and the drive shafts of the compressor and alternator are offset from one another in the direction of the x-axis. The triangular arrangement enables the APU to be compact in size, such as by decreasing the length of the APU in the y-direction compared with an in-line arrangement (e.g., when the engine, compressor, and alternator are all arranged in-line with one another).

The base frame includes a first side 406, a second side 408 that is opposite to (across a width of the base frame, in a direction of the x-axis) and parallel to the first side, a third side 410 that is adjacent to and perpendicular to both the first side and the second side, and a fourth side 412 that is opposite to (across a length of the base frame, in a direction of the y-axis) and parallel to the third side (and adjacent to and perpendicular to both the first side and the second side). The APU may be oriented transversely across a vehicle in which it is positioned, as will be further described below with respect to FIG. 7. For example, the length of the vehicle may be in the x-direction and the width of the vehicle may be in the y-direction with respect to the reference axes. Further, the third side may be oriented to a fresh air/cold side of the vehicle ("side A"), while the fourth side is oriented to a hot side of the vehicle ("side B"). Further still, the first side may be positioned proximate to an operator cab of the vehicle, while the second side may be positioned proximate to a radiator cab of the vehicle. Additionally, as shown in FIG. 4, the engine is mounted more proximal to the fourth side than the compressor and the alternator, which are more proximal to the third side. The relative orientation of the APU within the vehicle and the positioning of the internal components of the APU may enable cool air to be provided to the engine and the compressor, for example.

The common base frame is configured to enable installation of the APU into the vehicle via a fork lift. The base frame includes one or more support devices, shown in FIGS. 4-6 as elongate cavities 414a and 414b that are adapted to receive prongs of the fork lift. Thus, the support devices may enable the fork lift to both install the APU in the vehicle and remove the APU from the vehicle. The elongate cavities may be further configured to receive sling load mounts or attachment points. The elongate cavities (or ports) are arranged parallel to (but offset from) one another and extend across the length of the base frame (e.g., in the y-direction) and are positioned at opposite ends, across the width of the base frame (e.g., in the x-direction). For example, each elongate cavity may form a continuous cavity of substantially constant width (e.g., in the x-direction) and height (e.g., in the z-direction) that extends from a first opening on the third side to a second opening on the fourth side. Each of the elongate cavities may be fully enclosed, except for the openings at the third and fourth sides, by walls of the base frame. Further, the elongate cavities may be spaced apart such that the width (in the x-direction) between the first openings (across the third side) and the second openings (across the fourth side) matches a width between the prongs of the fork lift. Thus, the prongs may slide into the elongate cavities of the base frame from either side A or side B.

Further, once installed in the vehicle, the base frame may be secured to the vehicle via a plurality of mounting bolt holes. Mounting bolt holes 416a and 416b are shown in FIGS. 4 and 5, and mounting bolt holes 416c and 416d are shown in FIG. 6. As an example, the mounting bolt holes may serve as the attachment points included in the elongate cavities. The mounting bolt holes are each positioned at an opening of one of the elongate cavities, with one mounting bolt hole at each opening, and are positioned in a rectangular arrangement with respect to each other such that the mounting bolt holes are positioned at the outer corners of the base frame.

As shown in FIG. 5, the base frame is included in an exterior housing 502, the exterior housing further including a top wall 504, a first side wall 506, a second side wall 508 that is opposite to and parallel to the first side wall, a third side wall 510 that is perpendicular to each of the first side wall and the second side wall, and a fourth side wall 512 that is opposite to and parallel to the third side wall (and adjacent to and perpendicular to both the first side wall and the second side wall). The exterior housing may be rectangular in shape. Specifically, the top wall is perpendicular to each of the first side wall, the second side wall, the third side wall, and the fourth side wall and is parallel to the top surface of the base frame. Further, each of the first side wall, the second side wall, the third side wall, and the fourth side wall are perpendicular to the base frame and coupled between the top wall and the base frame. The first side wall may be flush with the first side of the base frame, the second side wall may be flush with the second side of the base frame, the third side wall may be flush with the third side of the base frame, and the fourth side wall may be flush with the fourth side of the base frame. Thus, when the exterior housing is coupled to the base frame, the exterior housing and the base frame form a rectangular enclosure, within which the engine, the compressor, and the alternator are entirely contained within an interior of the exterior housing. Additionally, the first opening of each of the elongate cavities is positioned directly below the third side wall, and the second opening of each of the elongate cavities is positioned directly below the fourth side wall.

An air duct 522 is arranged on (e.g., coupled directly to) the top wall of the exterior housing, the air duct having an opening 524 arranged perpendicular to the top wall and flush with the third side wall. The air duct extends across a length of the top wall (e.g., in the y-direction), parallel to each of the first side wall and the second side wall, until it curves toward the first side wall at a location that is proximate to the fourth side wall. The air duct couples to an interior air duct 622 shown in FIG. 6 at an aperture 624. For example, the aperture may comprise a first end of the interior air duct as well as an opening in the top wall (not visible in FIG. 6). The interior air duct, which is inside of the exterior housing (not visible in FIG. 6) is directly coupled to a compressor cooler 626 (e.g., via a second end of the interior air duct). Thus, the air duct may provide cooling airflow from side A to the compressor cooler, positioned at side B, resulting in higher heat transfer at the compressor cooler than if air was provided from side B. The compressor cooler in turn may be fluidly coupled to the compressor to provide cooling airflow to the compressor.

The engine may be controlled, at least in part, by an engine control unit 434 shown in FIGS. 4 and 6. For example, the engine control unit may be included in the APU control unit shown in FIGS. 2 and 3. Operation of the engine, the compressor, and the alternator will be further described with respect to FIG. 8. Air may be supplied to the engine via an engine air inlet 516, shown in FIG. 5, arranged in an aperture in the third side wall (e.g., on side A). Similarly, air may be supplied to the compressor via compressor air inlet 514 positioned in an aperture in the third side wall and arranged adjacent to the engine air inlet. Air compressed by the compressor may exit the compressor (and the APU) via a compressor outlet 422, arranged in an aperture in the third side wall and positioned vertically below the engine air inlet, after which it may be delivered to an air reservoir, as described above with respect to FIGS. 2-3. Electrical power generated by the alternator may be supplied to an APU battery 612 shown in FIG. 6, among other electrical loads. The APU battery may be coupled to the top surface of the base frame proximal to the first side. The APU battery may provide power to start the engine, for example, in addition to supplying power to loads contained within an electrical cabinet 610. The electrical cabinet may house an electrical and control interface, for example.

As shown in FIG. 6, a radiator 620 is positioned on (e.g., coupled to) the base frame behind the engine, relative to the y-axis, adjacent to the fourth side and the second side. The radiator is positioned adjacent to the compressor cooler, along the fourth side 412 of the base frame. The radiator and compressor cooler may both be directly coupled to the top surface of the base frame. The adjacent (e.g., side-by-side in the x-direction) arrangement of the radiator and the compressor cooler may further reduce a size of the APU compared with an in-line arrangement (e.g., in the y-direction).

A grid 518, shown in FIG. 5, coupled to the third side wall of the exterior housing and comprising a plurality of openings may enable air to flow from side A, across the compressor, the alternator, and the engine, and to the radiator positioned proximate to side B. Further, exhaust generated through engine operation may be emitted from the APU via an exhaust port 520. The exhaust port may include an aperture in the top wall of the exterior housing through which additional exhaust system components (such as an exhaust passage, muffler, etc.) may be fluidly coupled to the engine. Additional vents, grids, ports, and panels may be coupled in various locations on the exterior housing, such as via bolts or screws, enabling internal components of the APU to be accessed for maintenance while installed in a vehicle without removing the APU from the vehicle. As an example, ports for refilling oil (e.g., for the engine, the gearbox, and the compressor) may be coupled at various locations on the external housing (e.g., the top wall, the third side wall, and the fourth side wall).

FIG. 7 schematically shows an example relative positioning of the APU of FIGS. 4-6 within a vehicle 700. Side A as labeled in FIGS. 4-6 is coming out of the page, and side B is going into the page in FIG. 7. In one embodiment, the vehicle may be a rail vehicle including multiple locomotives and/or cars directly coupled to one another and arranged in a line. As shown in FIG. 7, the vehicle includes a locomotive 701 including a plurality of cabs connected to one another on the same vehicle platform 706 and a fuel tender car 714 directly coupled to the locomotive. The locomotive includes a first operator cab 702, a second operator cab 710, and engine cab 712, and a radiator cab 704, each of the cabs coupled to the same vehicle platform 706. The first operator cab represents an end of the locomotive, which may be a rear end when the locomotive travels in a forward direction from the second operator cab arranged at the opposite end of the locomotive. Thus, a longitudinal axis of the locomotive runs from left to right in the view shown in FIG. 7. Further, the longitudinal axis of the locomotive is parallel to the x-axis of reference axes 499 of FIGS. 4-6. In an alternate embodiment, the locomotive may not include the first operator cab 702 (e.g., may only include the second operator cab arranged at the opposite end of the locomotive), and the radiator cab 704 may be the end of the vehicle (e.g., no additional cabs may be coupled to the end of the radiator cab). The engine cab includes engine 12 and the fuel tender includes a regasification unit (e.g., vaporizer) and liquid natural gas fuel tank (not shown in FIG. 7) for sending gaseous natural gas (CNG) to each of the APU 450 and the engine 12. An example of a fuel tender car coupled to a locomotive and the internal components of the fuel tender and locomotive is shown in FIG. 9, as described further below.

The APU is shown installed on the vehicle platform in the radiator cab, with the third side wall arranged proximate to the operator cab. In some examples, such as shown in FIG. 7, the APU may be arranged in the radiator cab directly behind the operator cab. However, in other examples, the APU may be installed farther from the operator cab, such as at or near a rear of the radiator cab. A noise insulating material 708 may be provided between the operator cab and the APU (e.g., in a wall separating the operator cab and the radiator cab) in order to reduce an amount of noise generated from APU operation that is perceived at the operator cab. The elongate cavities are arranged perpendicular to the longitudinal axis of the vehicle, illustrating how a forklift may install the APU into the radiator cab from a side (e.g., side A or side B) of the vehicle. In this way, installation of the APU through a roof of the vehicle may be avoided. Additionally, the opening 524 of the air duct, on a top wall of the housing of the APU, is arranged at an exposed side of the radiator cab, perpendicular to the longitudinal axis of the vehicle. Thus, a length of the APU (e.g., in the y-direction with respect to the reference axes shown in FIGS. 4-6) is positioned transversely with respect to the longitudinal axis of the vehicle. By having the air flow paths into and out of the APU arranged perpendicular to the longitudinal axis of the vehicle, there is a clear air entry and exit path both into and out of the APU, with no additional equipment obstructing air flow. This arrangement, along with having a dedicated air path for the compressor cooler (via the top air duct) increases cooling to the APU and increases the overall efficiency of the APU. Further, the APU may be accessed from side A or side B, with no additional equipment obstructing access, to perform maintenance (e.g., oil refilling) while the APU remains coupled to the vehicle platform.

Turning now to FIG. 9, a schematic diagram of a vehicle including a locomotive 900 (may be similar to locomotive 701 shown in FIG. 7) and a fuel tender (may be similar to fuel tender 714 shown in FIG. 7) 910 is shown. Specifically, FIG. 9 shows the locomotive removably coupled to the fuel tender. It will be appreciated that additional fuel tenders, freight cars, locomotives, and/or other railroad cars may also be removably connected to fuel tender and/or the locomotive. In this example, the fuel tender provides gaseous natural gas (CNG), as described further below, to the locomotive. The locomotive may include an APU installed therein, such as the APU described herein, and as shown in FIG. 7.

The locomotive and the fuel tender are configured to run on a rail 902 (or set of rails) via a plurality of wheels. In one example the locomotive is powered for propulsion, while the fuel tender is non-powered. It will be appreciated that in other examples, the fuel tender may also be powered for propulsion by, for example, one or more traction motors. Additionally, FIG. 9 shows a tender controller 1020 on board the fuel tender and a locomotive controller 936 on board the locomotive. As described further below, the locomotive controller controls operation of a primary (e.g., main) engine 918, and the tender controller controls operation of the fuel tender. However, the locomotive controller may send signals and/or requests (e.g., commands) to the tender controller regarding operation of the fuel tender. For example, the first locomotive controller may send a request to the tender controller of the fuel tender to convert liquid natural gas to gaseous natural gas and send the gaseous natural gas via one or more fuel lines to an engine of the first locomotive, as described further below. Further, the locomotive controller may include instructions stored thereon (e.g., within a memory of the controller) for sending a plurality of requests to the tender controller and to components on board the fuel tender. The tender controller may then control actuators and/or components on board the fuel tender based on the requests sent from the locomotive controller on board the locomotive. As shown in FIG. 9, the tender controller and the locomotive controller communicate electronically with one another.

The locomotive includes an engine system 912 that comprises the primary engine having a plurality of cylinders. The primary engine may be referred to herein as the locomotive engine. In one embodiment, each cylinder is configured to have at least one gaseous fuel injector and at least one liquid fuel injector. In the depicted example, the locomotive is configured as a locomotive powered by the engine system that operates with various fuels, such as a first fuel and a second fuel. The fuels may include a liquid fuel, such as diesel fuel, an alternative fuel, and/or a gaseous fuel, or combinations thereof. In one example, the primary engine is a dual fuel engine, such as a gas turbine, a compression ignition engine, or a spark ignition engine. The first fuel is gaseous natural gas that is received from the fuel tender via a gaseous natural gas (CNG) fluidic coupling 914 (e.g., fuel line), and a second fuel is diesel fuel received from a diesel storage tank 916 via a fluidic coupling 922 on board the locomotive. While the engine system is configured in one embodiment herein as a multi-fuel engine operating with diesel fuel and natural gas, in other examples, the engine system may use various combinations of fuels other than diesel and natural gas.

The primary engine is configured to generate a torque that is transmitted to a power conversion unit 920 along a drive shaft 924. The power conversion unit is configured to convert the torque into electrical energy that is delivered via an electrical bus 928 to at least one traction motor 932 and to a variety of downstream electrical components in the locomotive. Such components may include, but are not limited to, compressors 940, blowers 944, batteries 948, an electronics control system 934 comprising one or more controllers, shutoff valves, pressure regulators, radiators, lights, on-board monitoring systems, displays, climate controls (not shown), and the like. The electrical bus further delivers electrical energy to the fuel tender.

Based on the nature of the generated electrical output, the electrical bus may be a direct current (DC) bus (as depicted) or an alternating current (AC) bus. In one example the power conversion unit includes an alternator (not shown) that is connected in series to one or more rectifiers (not shown) that convert the alternator's electrical output to DC electrical power prior to transmission along the electrical bus. The alternator may include, for example, a high-speed generator, a generator machine whose stator flux is synchronous to the rotor flux, or an asynchronous machine.

Based on the configuration of a downstream electrical component receiving power from the electrical bus, one or more inverters may be configured to invert the electrical power from the electrical bus prior to supplying electrical power to the downstream component. In one example, a single inverter may supply AC electrical power from a DC electrical bus to a plurality of components. In another non-limiting example, each of a plurality of distinct inverters may supply electrical power to a distinct component.

The traction motor receives electrical power from the power conversion unit and is coupled to one or more axles/driving wheels 952. In this manner, the traction motor is configured to drive the axles/driving wheels along the rail. It should be appreciated that the number of sets of axles/driving wheels may vary, and that one or more traction motors may be provided for each set of axles/driving wheels. The traction motor may be an AC motor. Accordingly, an inverter paired with the traction motor may convert DC input to an appropriate AC input, such as a three-phase AC input, for subsequent use by the traction motor. In other non-limiting embodiments, traction motor may be a DC motor directly employing the output of the power conversion unit after rectification and transmission along the DC bus.

One example locomotive configuration includes one inverter/traction motor pair per axle/driving wheel. The traction motor may also be configured to act as a generator providing dynamic braking to brake the locomotive. In particular, during dynamic braking, the traction motor may provide torque in a direction that is opposite from the rolling direction, thereby generating electricity that is dissipated as heat by resistors (not shown) connected to the electrical bus.

The locomotive controller on board the locomotive controls the primary engine by sending commands to various engine control hardware components, such as invertors, alternators, relays, fuel injectors, fuel pumps (not shown), or the like. In one example, the locomotive controller also monitors locomotive operating parameters in active operation, idle, and shutdown states. Such parameters may include, but are not limited to, manifold air temperature (MAT), ambient temperature, engine oil temperature, compressor air pressure, air reservoir pressure, battery voltage, a battery state of charge, brake cylinder pressure, or the like. The locomotive controller further includes computer readable storage media (not shown) including code for enabling on-board monitoring and control of rail vehicle operation.

The locomotive controller, while overseeing control and management of the primary engine and other locomotive components, may be configured to receive signals from a variety of engine sensors, as further described herein. The locomotive controller may utilize such signals to determine operating parameters and operating conditions, and correspondingly adjust various engine actuators to control operation of the locomotive. For example, the locomotive controller may receive signals from various engine sensors including, but not limited to, engine speed, engine load, boost pressure, exhaust pressure, ambient pressure, exhaust temperature, manifold pressure (MAP), or the like. Correspondingly, the locomotive controller may control the locomotive by sending commands to various components, such as traction motors, alternators, cylinder valves, throttles, or the like. As described further below, the locomotive controller at least partially controls operation of the fuel tender by sending commands (e.g., requests) to the tender controller on board the fuel tender. For example, the commands sent to the tender controller may include commands for controlling various components on board the fuel tender, such as a vaporizer 1034, a pump 1010, a LNG storage tank 1012, or the like. In another example, the commands sent to the tender controller may include requests for CNG (e.g., a request to send CNG to the locomotive). Then, in response to the request for CNG, the tender controller may adjust one or more of the vaporizer, the pump, and/or one or more valves controlling a flow of LNG and/or CNG in order to deliver the requested CNG to the locomotive.

In some examples, the vaporizer may be referred to as a regasification unit. For the purposes of this description, an "on-board" component, device, or other structure means that the component or device is physically located on the vehicle being described. For example, with respect to the fuel tender, a component or structure physically located on the fuel tender is on-board the fuel tender, including when the fuel tender is coupled to a locomotive or other rail vehicle and when the fuel tender is not coupled to a locomotive or other rail vehicle.

In one example, the computer readable storage media configured in the locomotive controller may execute code to auto-stop or auto-start the primary engine by enabling, for example, an Automatic Engine Start/Stop (AESS) control system routine. As discussed in more detail below, the locomotive controller also communicates with the tender controller on board the fuel tender to, for example, request delivery of gaseous natural gas for the primary engine. The computer readable storage media configured in the locomotive controller may execute code to appropriately transmit and receive such communications.

With continued reference to FIG. 9, the fuel tender is removably coupled to the locomotive and includes axles/wheels 1004 configured to travel along the rail. In the depicted example, the fuel tender includes six pairs of axles/wheels. In another example, the fuel tender includes four pairs of axles/wheels. The fuel tender further includes a mechanical coupling mechanism 1008 that removably couples the fuel tender to the locomotive for linked movement thereof. In other examples, the fuel tender may include a second coupling mechanism (not shown) that may removably couple the fuel tender to another rail vehicle, such as a freight car, radiator cab, or an additional locomotive.

The fuel tender is configured to carry one or more fuel storage tanks. In one embodiment, as shown in FIG. 9, the fuel tender includes the LNG storage tank as an on-board cryogenic LNG storage tank. The LNG storage tank is a fuel container wherein the fuel stored in the fuel container is LNG. In one example, the LNG storage may be a vacuum-jacketed pressure vessel that stores LNG at pressures ranging from approximately 10 psi to approximately 130 psi. It will be appreciated that to maintain LNG in a liquid state, the LNG may be stored at a temperature range of approximately 4-80 degrees Celsius. In another example, the LNG may be stored at a temperature above or below the range of 4-80 degrees Celsius. In yet another example, the LNG may be stored at a temperature range of approximately 60-120 degrees Celsius. In some examples, as shown in FIG. 9, the fuel tender includes a cryogenic unit 1068 for helping maintain the LNG within desired temperature and pressure ranges. In other example, the fuel tender may not include the cryogenic unit. Even with efficient insulation and cryogenic refrigeration equipment, heat may leak into the LNG storage tank and cause vaporization of portions of the LNG into boil-off gas.

It will also be appreciated that the LNG storage tank may have various sizes and configurations and may be removable from the fuel tender. Further, as shown in FIG. 9, the LNG storage tank is configured to receive LNG from an external refueling station via port 1022. In alternative examples, the storage tank may revive LNG through another port or location on the storage tank.

The LNG storage tank supplies LNG via cryogenic LNG fluidic coupling 1026 and one or more valves 1030 to the vaporizer. The vaporizer converts the LNG into gaseous or compressed natural gas (CNG) or vaporizes the LNG by the application of heat to the LNG. Specifically, the vaporizer vaporizes the LNG to CNG by utilizing heated fluid supplied to the vaporizer. As shown in in FIG. 9, heated fluid for the conversion of LNG to CNG is generated by a heat exchanger positioned on the locomotive. The heat exchanger receives engine cooling water from a radiator 972. Engine cooling water from the primary engine flows to the radiator to be cooled and then sent back to the primary engine. Before the cooled engine cooling water flows back to the primary engine, the cooled engine cooling water passes through the heat exchanger to heat a secondary fluid, or coolant. The coolant heated at the heat exchanger is then flowspumped from the heat exchanger to the vaporizer on the fuel tender via a pump 973 and a first heated coolant line 974 and a second heated coolant line 1074. The pump 973 may be an electric pump that receives electrical power from an APU on the locomotive (as shown in FIG. 7 and described herein). The first heated coolant line and the second heated coolant line are coupled together at a detachable interface coupling 1076 that enables the fuel tender to be decoupled from the locomotive. Coolant then returns to the heat exchanger 970 via a first coolant line 1078 and a second coolant line 978. The first coolant line and the second coolant line are coupled together at a detachable interface coupling 1080 that enables the fuel tender to be decoupled from the locomotive. In alternative embodiments, heat may be supplied to the vaporizer from an alternative source on board the locomotive, another locomotive, and/or fuel tender. For example, heat may be supplied to the vaporizer from APU 25 shown in FIG. 1.

The CNG is then delivered to the primary engine of the locomotive to power the primary engine. CNG may also be delivered to an APU of the locomotive, as shown in FIG. 7. As shown in FIG. 9, the CNG is delivered to the primary engine via a first CNG fluidic coupling 1016 and a second CNG fluidic coupling 994 and one or more control valves 1032. In yet another example, additional control valves may be positioned in the second CNG fluidic coupling to direct CNG to additional locomotives or rail cars. The second CNG fluidic coupling further includes a detachable interface coupling 1036 that enables the fuel tender to be decoupled from the locomotive.

In a first embodiment, the LNG storage tank may be a higher pressure LNG storage tank wherein the LNG is maintained at a pressure greater than a threshold supply pressure. In one example, the threshold supply pressure of CNG may be approximately 120 psi. The pressure within the LNG storage tank may then be maintained above 120 psi (e.g., 160 psi) so the CNG arriving at the locomotive is at the threshold supply pressure. In other examples, the threshold supply pressure of CNG may be greater or less than 120 psi, and the LNG storage tank pressure may be maintained at a level greater than the threshold supply pressure to account for any pressure losses in the CNG supply system. In this first embodiment, LNG is metered from the storage tank and to the vaporizer by the valve, or other metering device. CNG converted from the LNG at the vaporizer then flows to the locomotive via the first CNG fluidic coupling and the second CNG fluidic coupling. The flow of CNG to the first locomotive is controlled or metered via the valve.

In a second embodiment, the LNG storage tank may be a lower pressure LNG storage tank wherein the LNG is maintained at a pressure lower than the threshold supply pressure (e.g., less than 120 psi). For example, the LNG storage tank may maintain the LNG at a lower pressure of 50 psi. In this embodiment, a pump 1010 may be positioned in the LNG fluidic coupling 1026 to control a flow (e.g., flow rate) of LNG to the vaporizer and/or in the first CNG fluidic coupling 1016 to control a flow (e.g., flow rate) of CNG to the locomotive. In alternative embodiments, the pump may be positioned additionally or alternatively on the locomotive.

It will be appreciated that by converting the LNG to CNG on board the fuel tender and supplying CNG to the primary engine, standard gaseous natural gas conduit and interface couplings may be utilized between the fuel tender and the locomotive. Advantageously, such a configuration avoids costly cryogenic tubing and interface couplings, and the corresponding design challenges, that would otherwise be required for transferring LNG between the fuel tender and the locomotive. Additionally, using such standard, low pressure gaseous natural gas fluidic and interface couplings eliminates the possibility of LNG leaks between the fuel tender and the locomotive.

Components on the fuel tender are powered with electrical energy from the locomotive. Specifically, the electrical bus is coupled to an electrical bus 1028 at a detachable interface coupling 1014, which enables the fuel tender to be decoupled from the locomotive. The electrical bus of the fuel tender (e.g., electrical bus 1028) and the electrical bus of the locomotive (e.g., electrical bus 928) may be referred to herein as electrical energy lines. In one embodiment, the rail vehicle may include one or more electrical energy lines traversing a space between the locomotive and the fuel tender.

Electrical energy generated at the locomotive travels to the fuel tender through the electrical bus of the locomotive and the fuel tender. Components on board the fuel tender receiving electrical energy may include, but are not limited to, the vaporizer, the tender controller, the control valves (e.g., control valves 1030 and 1032), a LNG tank pressure sensor 1060, an LNG tank temperature sensor 1064, the cryogenic unit, flow meters, ambient air temperature sensors, compressors, blowers, radiators, batteries, lights, on-board monitoring systems, displays, climate controls (not shown), and the like.

The tender controller on board the fuel tender controls and/or actuates various components on board the fuel tender, such as the vaporizer, the cryogenic unit, the control valves, one or more pumps, and/or other components on board the fuel tender by sending commands to such components. The commands sent by the tender controller may be based on commands sent to the tender controller from the locomotive controller on board the locomotive. For example, the locomotive controller may send a request to the tender controller to stop vaporizing LNG and thereby stop the conversion of LNG to CNG. In response, the tender controller may actuate the vaporizer to turn off or stop vaporizing LNG.

The tender controller may also monitor fuel tender operating parameters. Such parameters may include, but are not limited to, pressure and temperature of the LNG storage tank, a level or volume of the LNG storage tank, pressure and temperature of the vaporizer, ambient air temperature, and the like. In one example, the tender controller may send a fuel value measurement measured at the LNG storage tank to the locomotive controller on board the locomotive.

It will be appreciated that the fuel tender is not limited to the components shown in the example of FIG. 9 and described above. In other examples, the fuel tender may include additional or alternative components. As an example, the fuel tender may further include one or more additional sensors, flow meters, control valves, or the like.

As explained above, the fuel tender shown in FIG. 9 may be coupled to an end of a locomotive including both a main engine and an APU, such as the main engine and APU described herein and shown in the example platform of FIG. 7.

Figure 8:
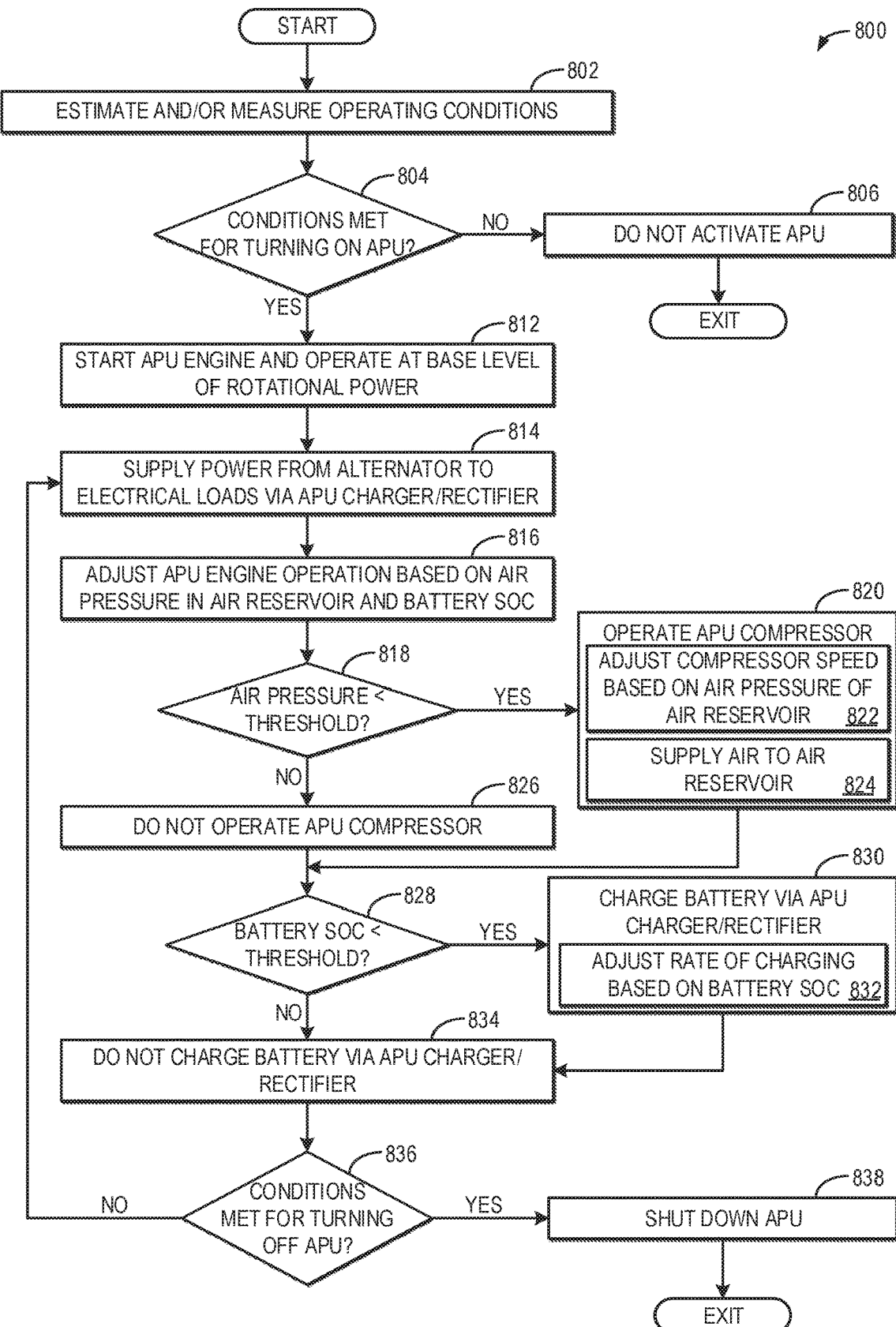
FIG. 8 is a flow chart showing a method for operating an auxiliary power unit to power one or more electrical components and provide compressed air to an air reservoir when a main engine is not operating, according to an embodiment of the invention.
Figure 9:
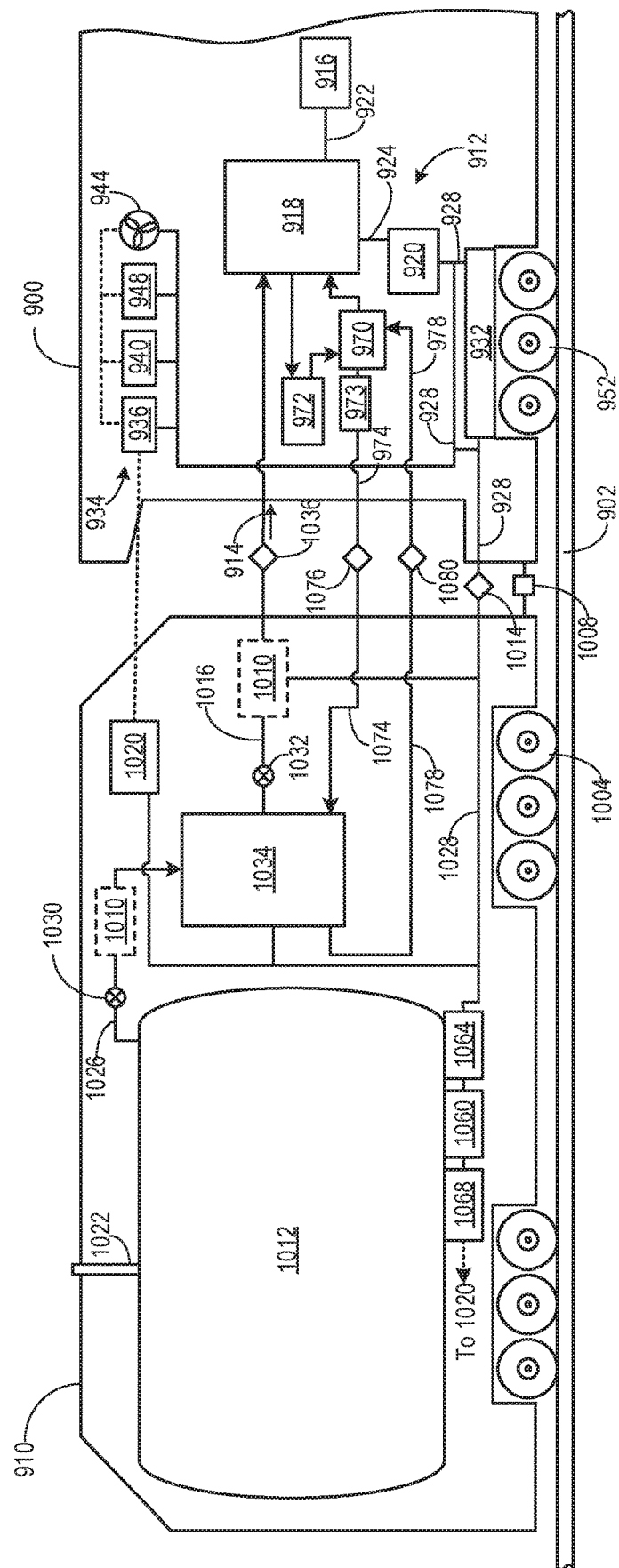
FIG. 9 shows a schematic diagram of an example fuel tender and natural gas-fueled locomotive according to an embodiment of the invention.

FIG. 8 shows a flow chart of an example method 800 for operating an APU to power electrical loads of a vehicle and provide compressed air to an air reservoir of the vehicle. A main engine of the vehicle may be referred to simply as "the engine," the "main engine" in FIG. 8, whereas an engine of the APU will be referred to as "the APU engine." As one example, the APU is the APU 25 described above with respect to FIGS. 1-3 or the APU 450 illustrated in FIGS. 4-7, and the main engine is engine 12 shown in FIG. 1. Instructions for carrying out method 800 and the rest of the methods included herein may be executed by a vehicle control system (e.g., vehicle control system 14 shown in FIGS. 1-3) and/or an APU control unit (e.g., APU control unit 214 shown in FIGS. 2 and 3) based on instructions stored on a memory of the vehicle control system and/or the APU control unit. For example, at least a portion of method 800 may be executed by the vehicle control system in combination with various sensors and actuators of the vehicle system, and a remaining portion of method 800 may be executed by the APU control unit in conjunction with signals received from the vehicle control system and in combination with various sensors and actuators of the APU and the vehicle system, according to the method described below.

Method 800 begins at 802 and includes estimating and/or measuring operating conditions. The operating conditions may include engine speed and/or load, an electrical load (e.g., drain load) of one or more engine or vehicle electrical components, a state of charge (SOC) of a system battery, an air pressure level in an air reservoir of the vehicle (e.g., air reservoir 18 of FIG. 1), a detection of whether the APU is installed in a receiving space of the vehicle, vehicle speed, a notch level of the vehicle (e.g., of a rail vehicle), and whether or not vehicle brakes are applied. The SOC may be a percentage charge (or charge level) of a total charge capacity of the system battery. The operating conditions may further include whether the main engine is on (e.g., combusting air and fuel) or off (e.g., not combusting air and fuel). As an example, during select conditions, such as when the vehicle is stationary (e.g., with a vehicle speed of zero), the engaged notch level is zero (e.g., the vehicle is not being driven), the vehicle brakes are applied, the main engine has operated at idle speed for greater than a threshold duration, etc., the main engine may be shut down to reduce fuel usage. The threshold duration may be a pre-determined, non-zero time duration that is calibrated to reduce a frequency of shutting down and restarting the main engine by an AESS system included in the vehicle control system. As one non-limiting example, the threshold duration is 15 minutes. In some examples, all of the select conditions may be present for the main engine to be shut down, whereas in other examples, one or a subset of the select conditions may trigger the AESS system to shut down the main engine.

At 804, method 800 includes determining if conditions are met for turning on the APU. In a first example, the conditions for turning on the APU include the main engine being shut down. In a second example, in addition to the main engine being shut down, the conditions for turning on the APU further include the SOC of the system battery being less than a threshold SOC. The threshold SOC may be a pre-determined non-zero charge level at or above which the battery is considered to be at a full charge capacity, for example. In a third example, in addition to the main engine being shut down, the conditions for turning on the APU further include an estimation that the electrical load applied to the battery will deplete the battery to a SOC level that is less than the threshold SOC in less than a threshold duration. The threshold duration may be a pre-determined, non-zero time duration, such as a time duration in a range from seconds (e.g., 30 seconds) to minutes (e.g., 10 minutes). In a fourth example, in addition to the main engine being shut down, the conditions for turning on the APU further include the air pressure level of the air reservoir being less than a threshold air pressure level. The threshold air pressure level may be a pre-determined, non-zero threshold air pressure level at or above which the air reservoir may be considered to be at capacity. In a fifth example, in addition to the main engine being shut down, the conditions for turning on the APU further include a request to operate the vehicle in a battery-driven operation. For example, the request to operate the vehicle in the battery-driven operation may include a torque demand that can be met by operating an electric drive propulsion system (e.g., including electric traction motors 13 of FIG. 1) without supplying additional torque from the main engine for propulsion. In a sixth example, the conditions for turning on the APU include a request to generate power for a robotic machine coupled to the vehicle (e.g., robotic machine 30 of FIG. 1). In a seventh example, the conditions for turning on the APU include a demand for motive power that exceeds outputs of the main engine and the battery. In an eighth example, the conditions for turning on the APU include a request to generate heat for a regasification unit of a tender car of the vehicle (e.g., vaporizer 1034 of FIG. 9) or generate electricity for a pump for a cooling system that pumps heated coolant to the regasification unit. Thus, in some examples, the conditions for turning on the APU include the main engine being off, and in other examples, the conditions for turning on the APU include the engine being on. One or more of the conditions for turning on the APU may be present for the conditions for turning on the APU to be considered met.

If the conditions for turning on the APU are not met (e.g., none of the conditions for turning on the APU are present), method 800 proceeds to 806 and includes not activating the APU. For example, the APU engine will remain at rest, without combustion occurring in cylinders of the APU engine. At least in some examples, the APU control unit may be maintained in a reduced power or sleep mode while the APU engine is off. Further, the main engine will be maintained in its current operational state. For example, if the main engine is off, the main engine will be maintained off unless otherwise commanded on. Similarly, if the main engine is on, the main engine will remain on until otherwise commanded off. Following 806, method 800 exits.

If the conditions are met for turning on the APU at 804, method 800 proceeds to 812 and includes starting the APU engine and operating the APU engine at a base level of rotational power. For example, the vehicle control system may command the APU control unit to power on and perform a starting operation of the APU engine. The starting operation may include cranking the APU engine (e.g., with starter motor 310 shown in FIG. 3) and supplying fuel to the APU engine (e.g., via APU fuel system 304 shown in FIG. 3) to initiate combustion, increase the output speed of the APU engine to the base level, and maintain operation at the base level. As described above with reference to FIGS. 2-4, the APU engine may be rotationally coupled to each of a compressor and an alternator via a gearbox. The base level may correspond to a pre-determined torque output (or output speed) of the APU engine that has been calibrated to provide enough rotational power to operate one or more electrical loads (e.g., hotel loads) of the vehicle, including hotel loads, via electrical power generated via the alternator. The one or more electrical loads may include vehicle lights, an HVAC system, communication equipment of the vehicle, the natural gas regasification unit of the vehicle, and engine filters, for example.

Thus, in a first example, operation of the APU is initiated in response to the main engine being shut down, regardless of the SOC of the battery, the electrical load applied to the battery, or the air pressure level of the air reservoir. In a second example, operation of the APU is initiated in response to the SOC of the system battery being less than the threshold SOC while the main engine is off. In a third example, operation of the APU is initiated in response to the estimation that the electrical load applied to the battery will deplete the battery to a SOC level that is less than the threshold SOC in less than the threshold duration while the main engine is off. In a fourth example, operation of the APU is initiated in response to the air pressure level of the air reservoir being less than the threshold air pressure level while the engine is off. In a fifth example, operation of the APU is initiated in response to the request to operate the vehicle in the battery-driven operation while the main engine is off. In a sixth example, operation of the APU is initiated in response to the request to generate electrical power for the robotic machine, regardless of whether the main engine is on or off. In a seventh example, operation of the APU is initiated in response to the demand for motive power exceeding the outputs of the main engine and the battery, regardless of the SOC of the battery, the electrical load applied to the battery, or the air pressure level of the air reservoir. In an eighth example, operation of the APU is initiated in response to a request to generate heat for the regasification unit or generate electricity for the pump for the cooling system.

At 814, method 800 includes supplying power from the alternator to the one or more electrical loads via a charger/rectifier of the APU. The alternator converts mechanical energy (e.g., from rotation by the engine) to electrical energy in the form of alternating current. The charger/rectifier receives the alternating current from the alternator and converts it to direct current. For example, the charger/rectifier may be electrically coupled to the one or more loads for directly outputting DC power to the one or more electrical loads (e.g., the vehicle lights and the HVAC system). As another example, the charger/rectifier may indirectly supply the DC power to the one or more electrical loads by outputting power to the system battery, which then supplies the power to the one or more electrical loads. In an example, when the APU is started in response to the demand for motive power exceeding the outputs of the main engine and the battery, such as when the main engine operating at full throttle (e.g., a maximum notch level), the hotel, the electrical loads of the vehicle may be powered by the APU instead of the main engine, allowing a greater portion of the rotational power of the main engine to be used to propel the vehicle. Further, electrical energy produced by the main engine (e.g., via alternator 11 shown in FIG. 1) may be supplied to the electric traction motors (either directly or indirectly via the battery) to aid in propulsion. Further still, any additional electrical energy produced by the APU that is not consumed by the hotel loads of the vehicle may be supplied to the electric traction motors (either directly or indirectly via the battery) to further aid in propulsion. As another example, when the APU is started in response to the request to operate the vehicle in the battery-driven operation while the main engine is off, the charger/rectifier may supply power to the system battery (or a propulsion bank battery) and/or directly to the electric traction motors and may additionally supply power to other, hotel loads of the vehicle. As still another example, when the APU is started in response to the request to generate electrical power for the robotic machine, the charger/rectifier may supply power directly to the robotic machine. For example, power may only be supplied to the robotic machine, such as when the main engine is on and providing power to the battery and the hotel loads of the vehicle. In an alternative example, power generated by the APU may be supplied to the electrical loads of the vehicle, including the hotel loads, in addition to the robotic machine.

At 816, method 800 includes adjusting APU engine operation based on an air pressure in the air reservoir and the SOC of the system battery. The APU control unit may receive a signal indicating the SOC and receive a different signal indicating the air pressure in the air reservoir from the vehicle control system and automatically adjust fueling to the APU engine responsive to the received signals in order to adjust the torque output (or output speed) of the APU engine from the base level. For example, when the SOC is lower and/or the air pressure is lower, the APU control unit may increase the amount of fuel delivered to the APU engine to a higher amount, thereby increasing the engine speed and the torque output of the APU engine. Then, as the SOC increases and/or the air pressure increases, the APU control unit may decrease the amount of fuel provided to the engine from the higher amount, toward the amount provided for operating the APU engine at the base level. As one example, the APU control unit may input the air pressure and the SOC into one or more look-up tables, algorithms, or maps and output the amount of fuel to supply to the APU engine. In this way, more fuel may be provided when a higher load on the engine is demanded, such as when a higher rotational speed of the alternator is desired (e.g., when the system battery SOC is lower, a drain load applied to the system battery is higher, and/or when an electrical load demand on the APU is higher) and/or when a higher rotational speed of the compressor is desired (e.g., when the air pressure in the air reservoir is lower). The relationships between the air pressure and the compressor speed, the SOC and the alternator speed, and the APU engine output and each of the compressor speed and the alternator speed will be further described below with respect to method 800.

At 818, method 800 includes determining if the air pressure in the air reservoir is less than the threshold air pressure level (e.g., described above at 804). For example, when the air pressure is at the threshold air pressure level, providing additional pressurized air may overcharge the air reservoir, which may result in air reservoir degradation as well as consuming additional fuel through compressor operation increasing the load on the APU engine.

If the air pressure is less than the threshold air pressure level, method 800 proceeds to 820 and includes operating the APU compressor. Operating the APU compressor may include engaging a clutch that couples a drive shaft of the APU compressor to the gearbox, thereby rotationally connecting the compressor to a crankshaft of the APU engine, to operate the APU compressor at a non-zero speed.

Operating the APU compressor at 820 further includes adjusting the compressor speed based on the air pressure of the air reservoir, as indicated at 822. For example, the APU control unit may determine an air pressure demand of the air reservoir based on the current air pressure of the air reservoir. The air pressure demand may be inversely proportional to the air pressure of the air reservoir, so that the air pressure demand increases as the air pressure decreases. As an example, the APU control unit may input the air pressure of the air reservoir into one or more look-up tables, algorithms, or maps and output the air pressure demand. The APU control unit may then determine the compressor speed that will provide the air pressure demand using an additional one or more look-up tables, algorithms, or maps. As another example, the APU control until may directly input the current air pressure into one or more look-up tables, algorithms, or maps and output the corresponding compressor speed. The APU control unit may then determine a corresponding engine speed and/or torque output based on the determined compressor speed and deliver fuel to the engine to generate the determined engine speed and/or torque output. As an example, the APU control unit may input the compressor speed into one or more look-up tables, algorithms, or maps and output the corresponding engine speed (or torque output) and/or fueling amount to deliver to the engine for the input compressor speed. As the determined compressor speed increases, the output speed (or torque) of the APU engine (and therefore the amount of fuel supplied to the APU engine) increases. Furthermore, as a difference between the current air pressure and the threshold air pressure level increases (e.g., the air pressure decreases further below the threshold air pressure level), the determined compressor speed (and thus the APU engine speed/torque and fuel amount) increases by a larger amount (e.g., from the base level). Further still, while the APU is coupled to drive shaft of the compressor and operating the compressor, the electrical output of the APU may be adjusted from a first, base level for supplying electrical output to support the one or more electrical loads (e.g., at 814) to a second, higher level of electrical output.

Operating the APU compressor at 820 further includes supplying air output by the APU compressor to the air reservoir, as indicated at 824. In this way, the APU compressor may provide compressed air to the air reservoir while the main engine is shutdown, thereby maintaining an air level in the air reservoir.

Returning to 818, if the air pressure is not less than the threshold air pressure level, method 800 proceeds to 826 and includes not operating the APU compressor. For example, in response to the air pressure level increasing above the threshold air pressure level, the APU control unit may actuate the clutch to a disengaged position in which the drive shaft of the APU compressor and the crankshaft of the APU engine are uncoupled. In another example, in response to the air pressure level already being at or above the threshold air pressure level when the APU was started (e.g., at 812), the APU control unit may maintain the clutch in the disengaged position if the APU compressor and the APU engine are already uncoupled. With the APU compressor uncoupled from the engine via the disengaged clutch, the APU compressor may spin down to rest (or remain at rest if already uncoupled), with a rotational speed of zero, and may not supply pressurized air to the air reservoir. By not operating the APU compressor when the air pressure is not less than the threshold pressure, overcharging of the air reservoir may be reduced. Furthermore, the torque output (or output speed) of the APU engine may be reduced compared to when the APU compressor is operated (e.g., at 820), resulting in reduced fuel consumption.

Whether or not the compressor is operated, at 828, method 800 includes determining if the SOC of the system battery is less than the threshold SOC (e.g., as defined above at 804). If the SOC is less than the threshold SOC, method 800 proceeds to 830 and includes charging the system battery via the APU charger/rectifier. For example, the APU charger/rectifier may transmit electric current through the system battery, causing it to store electrical energy. Charging the system battery via the APU charger/rectifier at 830 further includes adjusting a rate of charging based on the battery SOC, as indicated at 832. As an example, as the SOC increases closer to the threshold SOC, the rate of charging may decrease. As the SOC decreases further from the threshold SOC, the rate of charging may increase. The APU control unit may input the system battery SOC into a look-up table, algorithm, or map and output the rate of charging for the input SOC, for example. By adjusting the rate of charging, overcharging of the system battery may be avoided when the battery SOC is close to the threshold SOC, while rapid charging may be provided when the battery SOC is further from the threshold SOC. In some examples, the alternator speed may be adjusted based on the rate of charging. For example, as the rate of charging increases, the alternator speed may increase, and as the rate of charged decreases, the alternator speed may decrease. As another example, as a difference between the battery SOC and the threshold SOC increases (e.g., SOC decreases further below the threshold SOC), the alternator speed (and thus the APU engine speed and fuel amount) may increase by a larger amount (e.g., from the base level). Further, while the APU is operated to supply electrical power to charge the system battery, the electrical output of the APU may be adjusted from the first, base level for supplying electrical output to support the one or more electrical loads (e.g., at 814) to a second, higher level of electrical output.

Returning to 828, if the system battery SOC is not less than the threshold SOC, method 800 proceeds to 834 and includes not charging the system battery via the APU charger/rectifier. By not charging the system battery when the SOC is not less than the threshold SOC, overcharging of the battery, which may degrade battery life, may be avoided. However, the APU charger/rectifier may continue to provide electrical energy to the one or more electrical loads of the vehicle, as described above at 814.

At 836, method 800 includes determining if conditions are met for turning off (e.g., shutting down) the APU. In a first example, the conditions for turning off the APU may include none of the conditions for turning on the APU (e.g., as described above at 804) being present. In a second example, the conditions for turning off the APU may include a main engine restart condition being present, such as when the APU is started in response to the main engine being shut down. The main engine restart condition includes conditions during which restarting the main engine is desired, such as to propel the vehicle in a forward or reverse direction. The conditions may include the vehicle brakes being disengaged, a driving gear of the engine being engaged, a torque request from a vehicle operator, etc. As an example, only one of the conditions may be confirmed for the engine restart condition to be present. In a third example, the conditions for turning off the APU include the electrical output of the APU falling below a determined level. The determined level may be the base level described above, in one example. For example, the vehicle controller may monitor the electrical output of the APU to determine if the electrical output of the APU is at or above the determined level. In a fourth example, the conditions for turning off the APU include the battery SOC increasing at a rate that is less than a first threshold rate. The first threshold rate is a non-zero rate corresponding to a SOC rate increase that is unable to sustain or increase the battery SOC. In a fifth example, the conditions for turning off the APU include the air pressure level of the air reservoir increasing at a rate that is less that a second threshold rate. The second threshold rate is a non-zero rate corresponding to an air pressure rate increase that is unable to sustain or increase the air reservoir pressure. Only one of the conditions for turning off the APU may be present for the conditions for turning off the APU to be considered met.

If the conditions for turning off the APU are not met, method 800 may return to 814 to continue supplying power from the alternator of the APU to one or more electrical loads of the vehicle via the APU charger/rectifier. In this way, the one or more electrical loads may remain powered by the APU. Further, the APU engine operation may continue to be adjusted as the air pressure in the air reservoir and the system battery SOC change (e.g., at 816). In this way, operation of the APU engine may be continually adjusted to meet a changing load demand of the compressor and the alternator.

If the conditions are met for turning off the APU, method 800 proceeds to 838 and includes shutting down the APU, including the APU engine. For example, the vehicle controller may transmit a control signal to the APU control unit to stop fuel delivery to the APU engine, ceasing combustion in the APU engine and allowing the APU engine (and any components rotationally coupled thereto, such as the alternator and the compressor) to spin down to rest. In some examples, such as when electrical or motive power is not demanded from the main engine and the main engine is off, the main engine may remain off. In other examples, such as when the main engine is already on and operating, the main engine may remain on in the absence of an additional command signal to shut down the main engine. In still other examples, the main engine is restarted in response to shutting down the APU, such as when the APU is shut down in response to the main engine restart condition, the electrical output of the APU falling below the determined level, the battery SOC increasing at a rate that is less than the first threshold rate, and/or the air pressure level in the air reservoir increasing at a rate that is less than the second threshold rate. For example, when the APU is shut down in response to the main engine restart condition, the AESS of the vehicle control system may restart the main engine by cranking the engine and providing fuel and air to initiate combustion. Then, in response to an output power of the main engine reaching a threshold level, the AESS may transmit the control signal to the APU control unit to stop fuel delivery to the APU engine. The threshold power level may correspond to a pre-determined power level at or above which the main engine produces enough power to supply power to the one or more electrical loads of the vehicle as well as maintain supply air to the air reservoir (e.g., via one or more compressors of the vehicle). As another example, when the APU is shut down in response to the electrical output of the APU falling below the determined level, the battery SOC increasing at a rate that is less than the first threshold rate, and/or the air pressure level in the air reservoir increasing at a rate that is less than the second threshold rate, restarting the main engine enables the main engine to generate electrical output, increase the battery SOC at a rate that is greater than the first threshold rate, and/or increase the air pressure level in the air reservoir at a rate that is greater than the second threshold rate. After the APU is shut down, the APU control unit may then enter a reduced power mode, at least in some examples. Following 838, method 800 exits.

In this way, an APU of a vehicle may be operated responsive to shutting down a main engine of the vehicle, responsive to a request for electrical power output, or responsive to a request for air pressure generation to supply compressed air to an air reservoir of the vehicle, supply electrical energy to a system battery, and/or supply electrical energy to one or more electrical components of the vehicle. Furthermore, while operating the APU, an output of an APU engine may be maintained at or above a base level based on demands of a compressor and an alternator of the APU. For example, the APU engine may be operated with the output at the base level in response to an air pressure in the air reservoir being at or above a threshold pressure and a SOC of the system battery being at or above a threshold SOC. Further, the APU engine may be operated with the output higher than the base level in response to the air pressure being below the threshold pressure and/or the SOC being less than the threshold SOC. As a result, fuel consumption is reduced by shutting down the main engine (e.g., during a non-moving operation of the vehicle) while the air pressure in the air reservoir is maintained by the smaller APU engine and the compressor of the APU and while the one or more electrical components are powered by the alternator of the APU. In this way, air brakes of the vehicle may be maintained, and the one or more electrical components, including vehicle lights, an HVAC system, and other hotel loads, may be maintained without draining the system battery. Additionally, the fuel consumption may be further reduced by adjusting the operation of the APU engine based on the air pressure and the SOC of the system battery, such as by decoupling the compressor from the APU engine (e.g., via a clutch) to reduce the output demand of the APU engine.

The technical effect of shutting down the main engine while providing power to the one or more electrical components via the APU and providing compressed air to the air reservoir via the APU is to continue operating the one or more electrical components and the air brakes while reducing fuel consumption of the vehicle. Engine wear of the main engine may also be reduced by reducing engine idle periods.

Further, by positioning the APU engine, the compressor, and the alternator in a triangular arrangement with respect to each other, a packaging space of the APU may be reduced. By coupling the compressor and the alternator to the APU engine via a gearbox, the compressor, the alternator, and the APU engine may each be operated at a different speed. Further still, by including a clutch between the APU engine and the compressor, the compressor may be decoupled from the APU engine by disengaging the clutch when operation of the compressor is not desired, thereby decreasing fuel consumption by the APU engine. Additionally, by completely enclosing the APU engine, the compressor, and the alternator within a rectangular housing that includes a base frame having a plurality of elongate cavities adapted to receive prongs of a fork lift, installation and replacement of the APU within the vehicle may be simplified and expedited. By having the air flow paths into and out of the APU arranged perpendicular to a longitudinal axis of the vehicle, a clear air entry and exit path both into and out of the APU may be provided, with no additional equipment obstructing air flow. This arrangement, along with having a dedicated air path for a compressor cooler (via an air duct) increases cooling to the APU and increases an overall efficiency of the APU.

The technical effect of mounting the APU engine, the compressor, and the alternator to a common base frame in a triangular arrangement is that a compactness of the APU is increased.

In one embodiment, an auxiliary power unit (APU) comprises: an engine, an alternator, and a compressor, all mounted to a common base frame in a triangular arrangement with the alternator and compressor arranged adjacent to one another and each of the alternator and compressor rotationally coupled with the engine through a gearbox spaced between the engine and each of the compressor and alternator. A first example of the APU further comprises an exterior housing coupled to the base frame and enclosing each of the engine, the alternator, and the compressor within an interior of the exterior housing. A second example of the APU optionally includes the first example and further comprises an air duct arranged on a top wall of the exterior housing. In a third example of the APU, which optionally includes one or both of the first and second examples, the top wall includes an aperture and wherein the air duct couples to an interior duct, inside the exterior housing, via the aperture, the interior air duct directly coupled to a compressor cooler of the APU, the compressor cooler fluidly coupled to the compressor to provide cooling airflow to the compressor. In a fourth example of the APU, which optionally includes one or more or each of the first through third examples, the base frame includes a plurality of elongate cavities with inlet openings at an end of the base frame, the plurality of elongate cavities adapted to receive prongs of a fork lift. In a fifth example of the APU, which optionally includes one or more or each of the first through fourth examples, the plurality of elongate cavities are arranged parallel to one another and extend along a length of the base frame from an exterior of the base frame to an interior of the base frame. In a sixth example of the APU, which optionally includes one or more or each of the first through fifth examples, the plurality of elongate cavities each form a continuous cavity of substantially constant width, each of the plurality of elongate cavities having a first opening on a first side of the base frame and a second opening on a second side of the base frame, the second side parallel to and opposite the first side across a length of the base frame. A seventh example of the APU optionally includes one or more or each of the first through sixth examples and further comprises a controller with computer readable instructions stored on non-transitory memory that, when executed during operation of the APU, cause the controller to start the engine and begin fueling the engine, to initiate operation of the APU, responsive to: a state of charge (SOC) of a battery of a vehicle in which the APU is installed being below a predetermined SOC threshold level, and a main engine of the vehicle is not in operation, and/or a drain load applied to the battery that will deplete the battery to a SOC level that is less than the predetermined SOC threshold level in less than a predetermined time period, and the main engine is not in operation, and/or an air pressure level of an air reservoir of the vehicle being blow a predetermined air pressure threshold level, and the main engine is not in operation. In an eighth example of the APU, which optionally includes one or more or each of the first through seventh examples, the instructions further cause the controller to adjust a position of a clutch adapted to rotationally couple and uncouple a crankshaft of the engine and a drive shaft of the compressor based on a received signal indicating an air pressure demand of the air reservoir. In a ninth example of the APU, which optionally includes one or more or each of the first through eighth examples, the instructions further cause the controller to adjust a rotational speed of the alternator, the alternator coupled to a charger of the APU, based on a received signal indicating the SOC of the battery.

In another embodiment, an auxiliary power unit (APU) comprises: an enclosed, rectangular housing including a top wall and a base frame arranged opposite the top wall, the base frame including a plurality of elongate cavities; an air vent arranged across a length of the top wall, a first end of the air vent directly coupled to an aperture in the top wall; an engine; a compressor rotationally coupled to the engine via a clutch and fluidily coupled to a compressor cooler coupled to the first end of the air vent; an alternator rotationally coupled to the engine, each of the engine, compressor, and alternator coupled directly to the base frame and contained entirely within an interior of the housing. In a first example of the APU, a second end of the air vent includes an opening arranged perpendicular to the top wall and flush with a side wall of the housing, the side wall arranged perpendicular to and directly coupled to each of the top wall and the base frame. In a second example of the APU, which optionally includes the first example, the plurality of elongate cavities are adapted to receive prongs of a fork lift and wherein openings of the plurality of elongate cavities are arranged directly below the side wall of the housing. In a third example of the APU, which optionally includes one or both of the first and second examples, the plurality of elongate cavities extend across a length of the base frame from a first side of the base frame to a second side of the base frame, the first side arranged opposite the second side. In a fourth example of the APU, which optionally includes one or more or each of the first through third examples, a first cavity of the plurality of elongate cavities is arranged adjacent to a third side of the base frame and a second cavity of the plurality of the elongate cavities is arranged adjacent to a fourth side of the base frame, each of the third side and the fourth side arranged perpendicular to both the first side and the second side of the base frame. In a fifth example of the APU, which optionally includes one or more or each of the first through fourth examples, the engine, the compressor, and the alternator are each coupled directly to the base frame in a triangular arrangement relative to one another. In a sixth example of the APU, which optionally includes one or more or each of the first through fifth examples, the compressor, the alternator, and the second end of the air vent are arranged proximate to a first side of the rectangular housing that receives a flow of cool air via a plurality of air inlets arranged in a wall of the first side of the rectangular housing, and the engine and the compressor cooler are arranged proximate to a second side of the rectangular housing that outputs a flow of hot air.

In another embodiment, a vehicle comprises: a radiator cab including a rectangular space positioned directly above a platform of the vehicle; an auxiliary power unit (APU) adapted to fit within the rectangular space, the APU comprising: a rectangular, outer housing including a base unit, a top wall, and four side walls coupled between the top wall and base unit; an engine, a compressor, and an alternator, all mounted to the base unit in a triangular orientation where the engine is arranged proximate to a first side wall of the four side walls and the compressor and alternator are arranged adjacent to one another and proximate to a second side wall of the four side walls, the second side wall arranged opposite the first side wall; an air vent coupled to and extending across a length of the top wall from an aperture in the top wall, proximate to the first side wall, to the second side wall, where an end of the air vent at the second side wall is arranged parallel to the second side wall. In a first example of the vehicle, the base unit includes elongate cavities, each of the elongate cavities including a first opening directly below the first side wall and a second opening directly below the second side wall, the first opening and the second opening directly opposite each other across a length of the base unit. In a second example of the vehicle, which optionally includes the first example, the APU is coupled to the platform via mounting bolt holes in the base unit, with the elongate cavities arranged perpendicular to a longitudinal direction of the vehicle and the second side wall arranged proximate to an operator cab of the vehicle.

FIGS. 4-6 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

As used herein, an element or step recited in the singular and proceeded with the word "a" or "an" should be understood as not excluding plural of said elements or steps, unless such exclusion is explicitly stated. Furthermore, references to "one embodiment" of the invention do not exclude the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. An auxiliary power unit (APU) of a vehicle, comprising:
    an engine, an alternator, and a compressor, all mounted to a common base frame in a triangular arrangement with the alternator and compressor arranged adjacent to one another, and each of the alternator and compressor rotationally coupled with the engine through a gearbox spaced between the engine and each of the compressor and alternator; and
    an air duct arranged on a top wall of a rectangular housing, the rectangular housing enclosing each of the engine, the alternator, and the compressor within an interior of the rectangular housing,
    wherein the air duct includes an opening arranged perpendicular to the top wall and flush with a side wall of the rectangular housing, the side wall arranged parallel to a longitudinal axis of the vehicle, and perpendicular to and coupled to each of the top wall and the common base frame, and
    wherein the side wall further comprises a plurality of apertures for an engine air inlet, a compressor air inlet, and a compressor air outlet.

2. The APU of claim 1, wherein the rectangular housing is directly coupled to the common base frame.

3. The APU of claim 2, wherein the top wall includes a top wall aperture and wherein the air duct couples to an interior air conduit inside the rectangular housing via the top wall aperture, the interior air conduit directly coupled to a compressor cooler of the APU, the compressor cooler fluidly coupled to the compressor to provide cooling airflow to the compressor.

4. The APU of claim 1, wherein the common base frame includes a plurality of elongate cavities, each of the plurality of elongate cavities having a respective inlet openings at an end of the common base frame, the plurality of elongate cavities adapted to receive prongs of a fork lift.

5. The APU of claim 4, wherein the plurality of elongate cavities are arranged parallel to one another and extend along a length of the common base frame.

6. The APU of claim 4, wherein the plurality of elongate cavities each form a continuous cavity of substantially constant width, each of the plurality of elongate cavities having a first opening on a first side of the common base frame and a second opening on a second side of the common base frame, the second side parallel to and opposite the first side across a length of the common base frame.

7. The APU of claim 1, wherein the engine is an auxiliary engine with respect to a main engine of the vehicle, the APU further comprising a controller with computer readable instructions stored on non-transitory memory that, when executed, cause the controller to start the auxiliary engine and begin fueling the auxiliary engine, to initiate operation of the APU, responsive to:
    a state of charge (SOC) of a battery of the vehicle in which the APU is installed being below a predetermined SOC threshold level, and the main engine of the vehicle not being in operation, and/or
    a drain load applied to the battery that will deplete the battery to a SOC level that is less than the predetermined SOC threshold level in less than a predetermined time period, and the main engine not being in operation, and/or
    an air pressure level of an air reservoir of the vehicle being below a predetermined air pressure threshold level, and the main engine not being in operation.

8. The APU of claim 7, wherein the computer readable instructions further cause the controller to adjust a position of a clutch adapted to rotationally couple and uncouple a crankshaft of the auxiliary engine and a drive shaft of the compressor based on a received signal indicating an air pressure demand of the air reservoir.

9. The APU of claim 7, wherein the alternator is coupled to a charger of the APU, and wherein the computer readable instructions further cause the controller to adjust a rotational speed of the alternator based on a received signal indicating the SOC of the battery.

10. An auxiliary power unit (APU) of a vehicle, comprising:
    a rectangular housing including a top wall and a base frame arranged opposite the top wall, the base frame including a plurality of elongate cavities;
    an air vent arranged across a length of the top wall, a first opening of the air vent coupled to an aperture in the top wall;
    an engine;
    a compressor rotationally coupled to the engine via a clutch and fluidly coupled to a compressor cooler coupled to the first opening of the air vent; and
    an alternator rotationally coupled to the engine, each of the engine, compressor, and alternator coupled directly to the base frame and contained entirely within an interior of the rectangular housing,
    wherein a second opening of the air vent is arranged perpendicular to the top wall and flush with a side wall of the rectangular housing, the side wall arranged parallel to a longitudinal axis of the vehicle, and perpendicular to and coupled to each of the top wall and the base frame, and
    wherein the side wall further comprises a plurality of apertures for an engine air inlet, a compressor air inlet, and a compressor air outlet.

11. The APU of claim 10, wherein the plurality of elongate cavities are adapted to receive prongs of a fork lift and wherein openings of the plurality of elongate cavities are arranged directly below the side wall of the rectangular housing.

12. The APU of claim 11, wherein each of the plurality of elongate cavities extends across a length of the base frame from a first side of the base frame to a second side of the base frame, the first side arranged opposite to the second side.

13. The APU of claim 12, wherein a first cavity of the plurality of elongate cavities is arranged adjacent to a third side of the base frame and a second cavity of the plurality of the elongate cavities is arranged adjacent to a fourth side of the base frame, each of the third side and the fourth side arranged perpendicular to both the first side and the second side of the base frame.

14. The APU of claim 10, wherein the engine, the compressor, and the alternator are each coupled directly to the base frame in a triangular arrangement relative to one another.

15. The APU of claim 10, wherein the compressor, the alternator, and the second opening of the air vent are arranged proximate to a first side of the rectangular housing, and the engine and the compressor cooler are arranged proximate to a second side of the rectangular housing.

16. A vehicle, comprising:
 a radiator cab including a rectangular space positioned directly above a platform of the vehicle; and
 an auxiliary power unit (APU) adapted to fit within the rectangular space, the APU comprising:
 a rectangular housing including a base unit, a top wall, and four side walls coupled between the top wall and the base unit;
 an engine, a compressor, and an alternator, all mounted to the base unit in a triangular orientation where the engine is arranged proximate to a first side wall of the four side walls and the compressor and alternator are arranged adjacent to one another and proximate to a second side wall of the four side walls, the second side wall arranged opposite to the first side wall, the first side wall and second side wall arranged parallel to a longitudinal axis of the vehicle; and
 an air vent coupled to and extending across a length of the top wall from an aperture in the top wall, proximate to the first side wall, and to the second side wall, such that an opening of the air vent at the second side wall is arranged flush with the second side wall,
 wherein the second side wall further comprises a plurality of apertures for an engine air inlet, a compressor air inlet, and a compressor air outlet.

17. The vehicle of claim 16, wherein the base unit includes elongate cavities, each of the elongate cavities including a first opening directly below the first side wall and a second opening directly below the second side wall, the first opening directly opposite to the second opening with respect to a length of the base unit.

18. The vehicle of claim 17, wherein the APU is coupled to the platform via mounting bolt holes in the base unit, with the elongate cavities arranged perpendicular to the longitudinal axis of the vehicle and such that the APU is arranged proximate to an operator cab of the vehicle, the operator cab adjacent to the radiator cab.

* * * * *